(12) United States Patent
Domine et al.

(10) Patent No.: US 11,839,867 B2
(45) Date of Patent: Dec. 12, 2023

(54) CATALYTIC METHOD FOR THE PRODUCTION OF HYDROCARBONS AND AROMATIC COMPOUNDS FROM OXYGENATED COMPOUNDS CONTAINED IN AQUEOUS MIXTURES

(71) Applicants: Consejo Superior de Investigaciones Cientificas (CSIC), Madrid (ES); Universitat Politecnica de Valencia, Valencia (ES)

(72) Inventors: Marcelo Eduardo Domine, Valencia (ES); Alberto Fernández-Arroyo Naranjo, Valencia (ES); José Manuel López Nieto, Valencia (ES)

(73) Assignees: CONSEJO SUPERIOR DE INVESTIGACIONES CIENTIFICAS, Madrid (ES); UNIVERSITAT POLITECNICA DE VALENCIA, Valencia (ES)

( * ) Notice: Subject to any disclaimer, the term of this patent is extended or adjusted under 35 U.S.C. 154(b) by 502 days.

(21) Appl. No.: 17/058,395

(22) PCT Filed: May 23, 2019

(86) PCT No.: PCT/ES2019/070340
§ 371 (c)(1),
(2) Date: May 21, 2021

(87) PCT Pub. No.: WO2019/224412
PCT Pub. Date: Nov. 28, 2019

(65) Prior Publication Data
US 2021/0379564 A1  Dec. 9, 2021

(30) Foreign Application Priority Data
May 25, 2018  (ES) ................ ES201830508

(51) Int. Cl.
B01J 23/20 (2006.01)
B01J 8/00 (2006.01)
(Continued)

(52) U.S. Cl.
CPC ............... B01J 23/20 (2013.01); B01J 8/001 (2013.01); B01J 8/02 (2013.01); B01J 8/24 (2013.01);
(Continued)

(58) Field of Classification Search
CPC ....... B01J 8/001; B01J 8/02; B01J 8/24; B01J 21/063; B01J 23/10; B01J 23/14;
(Continued)

(56) References Cited

U.S. PATENT DOCUMENTS 4,448,898 A    5/1984  Sun
2009/0255171 A1  10/2009  Dumesic et al.
(Continued)

FOREIGN PATENT DOCUMENTS

CN    105661914 A    6/2016
CN    105339304 A    2/2019
(Continued)

OTHER PUBLICATIONS

Veses et al., "Catalytic upgrading of biomass derived pyrolysis vapors over metal-loaded ZSM-5 zeolites: Effect of different metal cations on the bio-oil final properties", ELSEVIER, Microporous and Mesoporous Materials, vol. 209, Jun. 2015, pp. 189-196, 8 pages.
(Continued)

Primary Examiner — Brian A McCaig
(74) Attorney, Agent, or Firm — Hayes Soloway PC

(57) ABSTRACT

The present invention relates to a method for producing mixtures of hydrocarbons and aromatic compounds, for use as fuel components (preferably in the range C5-C16), by
(Continued)

means of catalytic conversion of the oxygenated organic compounds contained in aqueous fractions derived from biomass treatments, wherein said method can comprise at least the following steps: (i) bringing the aqueous mixture containing the oxygenated organic compounds derived from biomass in contact with a catalyst comprising at least Sn and Nb, Sn and Ti, and combinations of Sn, Ti and Nb; (ii) reacting the mixture with the catalyst in a catalytic reactor at temperatures between 100 and 350° C. and under pressures from 1 to 80 bar in the absence of hydrogen; and (iii) recovering the products obtained by means of the liquid/liquid separation of the aqueous and organic phases.

18 Claims, 7 Drawing Sheets

(51) Int. Cl.
 *B01J 8/02* (2006.01)
 *B01J 8/24* (2006.01)
 *C10G 3/00* (2006.01)
(52) U.S. Cl.
 CPC ............... *C10G 3/44* (2013.01); *C10G 3/57* (2013.01); *C10G 3/60* (2013.01); *C10G 2300/1014* (2013.01)
(58) Field of Classification Search
 CPC ........... B01J 23/20; B01J 35/002; C10G 3/44; C10G 3/57; C10G 3/60; C10G 2300/1014; Y02P 30/20
 See application file for complete search history.

(56) References Cited

U.S. PATENT DOCUMENTS

| | | |
|---|---|---|
| 2013/0079566 A1 | 3/2013 | Lin |
| 2014/0288338 A1 | 9/2014 | Radlein et al. |
| 2017/0000886 A1 | 1/2017 | Lindblad et al. |
| 2017/0369789 A1 | 12/2017 | Hart |

FOREIGN PATENT DOCUMENTS

| | | | | |
|---|---|---|---|---|
| KR | 20060095075 A | 8/2006 | | |
| WO | 2008109877 A1 | 9/2008 | | |
| WO | 2010025241 A2 | 3/2010 | | |
| WO | WO-2010135553 A1 * | 11/2010 | ............ | B01J 23/002 |
| WO | 2014167524 A1 | 10/2014 | | |
| WO | 2015008110 A1 | 1/2015 | | |
| WO | 2015193461 A2 | 12/2015 | | |
| WO | 2017162900 A1 | 9/2017 | | |
| WO | 2018042804 A1 | 3/2018 | | |

OTHER PUBLICATIONS

Miguel Ángel González-Borja and Daniel E. Resasco, "Anisole and Guaiacol Hydrodeoxygenation over Monolithic Pt-Sn Catalysts", American Chemical Society, Energy Fuels, 2011, vol. 25, Issue 9, pp. 4155-4162, Publication Date:Jul. 26, 2011, 8 pages.
Lup et al., "A review on reactivity and stability of heterogeneous metal catalysts for deoxygenation of bio-oil model compounds", Journal of Industrial and Engineering Chemistry, ELSEVIER, Dec. 25, 2017, vol. 56, pp. 1-34, 34 pages.
Lu et al., "Catalytic upgrading of biomass fast pyrolysis vapors with titania and zirconia/titania based catalysts", Science Direct, ELSEVIER, vol. 89, Issue 8, Aug. 2010, pp. 2096-2103, 8 pages.
Fornell et al., "Anodic formation of self-organized Ti(Nb, Sn) oxide nanotube arrays with tuneable aspect ratio and size distribution", Electrochemistry Communications, ELSEVIER, Aug. 2013, vol. 3, p. 84 87, 4 pages.
Arcozzi et al., "The control of catalytic performance of rutile-type Sn/V/Nb/Sb mixed oxides, catalysts for propane ammoxidation to acrylonitrile", ELSEVIER, Catalysis Today, Oct. 15, 2008, vol. 138, Issues 1-2, pp. 97-103, 7 pages.
Wang et al., "Surface and catalytic properties of doped tin oxide nanoparticles", Applied Surface Science, ELSEVIER, 2010, vol. 257, pp. 127-131, 5 pages.
Huber et al., "Synthesis of Transportation Fuels from Biomass: Chemistry, Catalysts, and Engineering", Chemical Reviews, 2006, vol. 106, Issue 9, pp. 4044-4098, 55 pages.
Cherubini et al., "Toward a common classification approach for biorefinery systems", Wiley InterScience, Biofpr, Jun. 19, 2009, vol. 3, Issue 5, pp. 534-546, 13 pages.
Corma et al., "Chemical Routes for the Transformation of Biomass into Chemicals", Chemical Reviews, 2007, vol. 107, Issue 6, pp. 2411-2502, 92 pages.
Asadieraghi et al., "Model compound approach to design process and select catalysts for in-situ bio-oil upgrading", Renewable and Sustainable Energy Reviews, ELSEVIER, Aug. 2014, vol. 36, pp. 286-303, 6 pages.
Iojoiu et al., "Hydrogen production by sequential cracking of biomass-derived pyrolysis oil over noble metal catalysts supported on ceria-zirconia", ELSEVIER, Applied Catalysis A: General, 2007, vol. 323, pp. 147-161, 15 pages.
Gaertner et al., "Catalytic coupling of carboxylic acids by ketonization as a processing step in biomass conversion", ELSEVIER, Journal of Catalysis, Aug. 15, 2009, vol. 266, Issue 1, pp. 71-78, 8 pages.
Gangadharan, et al., "Condensation reactions of propanal over CexZr1-xO2 mixed oxide catalysts", ELSEVIER, Applied Catalysis A: General, vol. 385, Issued 1-2, 2010, pp. 80-91, 12 pages.
Fernandez-Arroyo et al., "Upgrading of oxygenated compounds present in aqueous biomass-derived feedstocks over NbOxbased catalysts", Catalysis Science & Technology, 2017, Issue 23, 6 pages.
Serrano-Ruiz et al., "Effect of the support composition on the vapor-phase hydrogenation of crotonaldehyde over Pt/CexZr1-xO2 catalysts", ELSEVIER, Journal of Catalysis, vol. 241, Issue 1, 2006, pp. 45-55, 11 pages.

\* cited by examiner

US 11,839,867 B2

CATALYTIC METHOD FOR THE PRODUCTION OF HYDROCARBONS AND AROMATIC COMPOUNDS FROM OXYGENATED COMPOUNDS CONTAINED IN AQUEOUS MIXTURES

CROSS-REFERENCE TO RELATED APPLICATIONS AND PRIORITY

This patent application claims priority from PCT Patent Application No. PCT/ES2019/070340 filed May 23, 2019, which claims priority from Spanish Patent Application No. P201830508 filed May 25, 2018. Each of these patent applications are herein incorporated by reference in their entirety.

FIELD OF THE INVENTION

This invention belongs to the field of the synthesis and application of solid catalysts for converting biomass, mainly lignocellulosic biomass, and the derivatives thereof into liquid fuels for transportation.

STATE OF THE ART PRIOR TO THE INVENTION

The biomass, together with the $CO_2$, is one of the primary and renewable sources of charcoal. The recovery of biomass (mainly plant or lignocellulosic biomass) and the derivatives thereof is a sustainable alternative to the use of fossil fuel sources for the production of fuels and chemical products, thus enabling the obvious problems of depletion of non-renewable resources and the environmental issues associated with them to be reduced [G. W. Huber, S. Iborra, A. Corma. *Chemical Reviews*, 106 (2006) 4044]. In this sense, in the new concept of biorefinery and bio-economy, the co-production of biofuels together with other chemical products of interest is essential. Likewise, in the new innovative strategies for the treatment of 2nd generation biomass (not competing with food), the recovery of waste streams and aqueous effluents obtained during biorefinery processes is also necessary [F. Cherubini et al., *Biofuels, Bioproducts and Biorefining*, 3 (2009) 534].

In this context, and after a primary treatment of the lignocellulosic biomass (for example, through processes involving pyrolysis, liquefaction and thermal or catalytic hydrolysis, as well as fermentation processes), aqueous fractions can be obtained containing mixtures of oxygenated organic compounds (i.e. acids, aldehydes, alcohols, polyols, sugars, furans, phenols, etc.) which are not currently being exploited [A. Corma, S. Iborra, A. Velty, *Chemical Reviews*, (2007) 2411]. Thus, by means of thermal or catalytic pyrolysis processes, the pyrolysis oils or bioliquids can be mainly obtained. These bioliquids are complex mixtures of more than 200 components, containing different proportions of water and mainly oxygenated organic compounds (i.e. alcohols, ketones, acids, polyalcohols, furans, phenols, among others) with different molecular sizes which are characterised by the high oxygen content and great reactivity thereof. Bio-liquids also have a high acidity due to the presence of short-chain carboxylic acids (C1-C4), which makes the storage and direct use thereof difficult. These properties, added to the instability thereof in the face of temperature, make an upgrading step necessary prior to the storage and use thereof. Due to the complexity of these mixtures, which are difficult to treat as a whole, one of the most used strategies consists of separating the different components of the bioliquid in order to facilitate the subsequent treatment thereof [documents US 2014/0288338, US 2013/0079566, WO 2015/08110].

After a liquid-liquid separation process by means of adding water or organic solvents to the bioliquid, on the one hand, an organic phase can be obtained containing several organic compounds of interest for subsequent use as fuels; and on the other hand, aqueous fractions and effluents containing short-chain carboxylic acids C1-C4 (mainly acetic acid) together with other compounds such as aldehydes, ketones or alcohols and small amounts of furan compounds and/or heavier compounds, which are not currently being used and constitute waste streams in bio-refineries [M. Asadieraghi et al., *Renewable and Sustainable Energy Reviews*, 36 (2014) 286, E. E. Iojoiu et al., *Applied Catalysis A: Gen.* 323 (2007) 147].

These oxygenated organic compounds, most of them being short-chain compounds (<C5), have little value by themselves, but they can be efficiently converted in order to generate mixtures of longer-chain hydrocarbons and aromatic compounds which are very useful as precursors, components and/or additives in automotive liquid fuels. These compounds (hydrocarbons and aromatics) are produced by the formation of carbon-carbon bonds through reactions involving condensation, ketonisation, alkylation with alcohols, which occur consecutively [C. A. Gaertner et al. *Journal of Catalysis*, 266 (2009) 71]. Furthermore, given the diversity of organic molecules present in the system, other reactions can occur such as decarboxylation reactions, dehydration reactions or esterification reactions when treating these complex aqueous mixtures.

To this end, it is necessary to develop new catalysts and catalytic processes that are capable of carrying out the desired reactions in the lowest number of steps possible and with high efficiency. In this context, it is highly relevant to study solid catalysts with mixed Ce—Zr oxides [A. Gangadharan et al., *Applied Catalysis A: Gen.* 385 (2010) 80-91], which enable the conversion into the gaseous phase and high temperatures (>300° C.) of aldehydes with a low molecular weight (for example, propanal) in the presence of carboxylic acids and water, mainly through aldol condensation and ketonisation processes. The activity of these materials is due to the multifunctional properties thereof possessing isolated and well-distributed active sites that can function cooperatively (for example, acid-base and redox sites). However, the stability of the catalyst under the reaction conditions (presence of water and high temperatures) is a point to improve in the new materials to be developed for these types of applications.

More recently, Nb oxide-based materials have been synthesised by means of hydrothermal synthesis (A. Fernandez-Arroyo et al., *Catalysis Science & Technology* 7 (2017) 5495-5499) and Nb—W mixed oxides (WO 2017162900) with pseudo-crystalline structures (and arranged on a single crystallographic axis) and improved acidic properties. These materials have been found to be active catalysts in consecutive condensation reactions of oxygenated compounds in water, with yields of products of interest similar to those presented by the Ce—Zr mixed oxide catalysts, also demonstrating a certain resistance and stability under the reaction conditions. However, both the catalytic activity and the stability of the catalysts working at high temperatures and pressures in an aqueous medium must be improved in order to efficiently develop these types of applications.

DESCRIPTION OF THE INVENTION

The present invention refers to a catalytic method for producing mixtures of hydrocarbons and aromatic compounds, which can comprise, at least, the following steps:

(a) bringing an aqueous mixture containing oxygenated organic compounds derived from primary treatments of biomass in contact with a catalyst, which can contain in the composition thereof at least Sn and Nb, and combinations of Sn—Nb with other transition metals, rare earth elements or lanthanides, Sn and Ti, and combinations of Sn—Ti with other transition metals, rare earth elements or lanthanides, Sn, Nb and Ti, and combinations of Sn—Nb—Ti with other transition metals, rare earth elements or lanthanides, and which, in the calcined form thereof, is mainly made up (more than 65% by weight) of the rutile crystalline phase of $SnO_2$.

(b) reacting the mixture with the catalyst in a catalytic reactor at temperatures between 100 and 350° C. and under pressures from 1 to 80 bar in the absence of hydrogen;

(c) recovering the products obtained in step (b) by means of the liquid/liquid separation of the aqueous and organic phases.

According to a particular embodiment, the method of the present invention for the catalytic condensation of oxygenated organic compounds present in aqueous fractions derived from the biomass in mixtures of hydrocarbons and aromatic compounds (preferably C5-C16) can use a catalyst which has the empirical formula:

$$Sn_aNb_bTi_cM_dO_e$$

wherein:

M is a chemical element from the group of transition metals, rare earth elements or lanthanides, a is comprised between 0.05 and 10.0 b and c are comprised between 0 and 10.0, with c+b other than zero (c+b≠0)

d is comprised between 0 and 4.0 and e has a value which depends on the oxidation state of the elements Sn, Nb, Ti and the element M.

According to this embodiment, the catalyst must meet the condition that the catalyst comprises at least Sn and Nb and/or Ti, and which, in the calcined form thereof, it is presented as a mixed metal oxide mainly made up of the rutile crystalline phase of $SnO_2$ wherein at least Nb and/or Ti are incorporated.

Said catalyst can be prepared by conventional methods starting from solutions of compounds of the different elements, of solutions of the same pure elements, or a mixture thereof, with the desired atomic ratios. Said solutions are preferably aqueous solutions.

According to another particular embodiment of the present invention, the catalyst is obtained by means of a process comprising at least:

a) a first step, of mixing compounds of the different elements, of pure elements, or a mixture thereof, b) a second step, of drying the solid obtained in the first step and c) a third step, of calcinating the dry solid obtained in the second step.

The mixing step can be performed starting from the compounds of the different elements, starting from the pure elements themselves in solution, using co-precipitation methods or by hydrothermal methods.

The elements Sn, Nb, Ti and the metal M can be incorporated into the mixing step as pure metal elements, as salts, as oxides, as hydroxides, as alkoxides, or as mixtures of two or more of the mentioned forms. The following are preferably used as salts: sulphates, nitrates, oxalates or halides, without these examples being limiting.

The Sn can be incorporated into the mixing step preferably as tin oxide, tin acetate, tin nitrate, tin chloride, tin fluoride, tin isopropoxide, tin oxalate or tin sulphate.

The Nb can be incorporated into the mixing step preferably as niobium pentoxide, niobium oxalate, niobium chloride or Nb metal.

The Ti can be incorporated into the mixing step preferably as titanium dioxide, titanium oxychloride, titanium oxysulphate, titanium nitrate, titanium tetrachloride, titanium ethoxide, titanium isopropoxide, titanium butoxide or Ti metal.

The mixing step can be followed by a period of static residence in the reactor, or the mixing can be performed with stirring. Both the static residence and the stirring can be performed in a normal reactor or in an autoclave.

The mixing step can be carried out in solution or by hydrothermal treatment.

The drying step can be performed by conventional methods in the oven, evaporation with stirring, rotary evaporation, or vacuum drying.

The step of calcinating the dry solid can be performed in an atmosphere made of an inert gas, such as for example, nitrogen, helium, argon or mixtures thereof, as well as air or mixtures of air with other gases.

This calcination step can be carried out by passing a flow of inert gas (with space velocities between 1 and 400 $h^{-1}$) or statically. The temperature is preferably in a range comprised between 250 and 850° C. and more preferably between 400 and 600° C. The calcination time is not determining, but it is preferably comprised in a range between 0.5 hours and 20 hours. The heating rate is not determining, but it is preferably in a range between 0.1° C./minute and 10° C./minute. The catalyst can also be initially calcined in an oxidising atmosphere up to a temperature comprised between 200 and 350° C., and more preferably between 240 and 290° C., and subsequently be subjected to calcination in an inert atmosphere.

According to this embodiment, the catalyst is obtained, as indicated above, by co-precipitation of the elements, either from precursor compounds containing the different elements or from the pure elements themselves in solution. As precursor compounds containing the elements Sn, Nb, Ti and the element M the following can be used: salts, oxides, hydroxides, alkoxides or mixtures of two or more of the mentioned forms. The following are preferably used as salts: sulphates, nitrates, oxalates or halides. The following can be used as solvents: water, methanol, ethanol, iso-propanol, acetonitrile, dioxane, or mixtures thereof, preferably water. The co-precipitation of the elements in the solution is performed by a controlled change in pH by adding a basic compound selected from alkali metal hydroxides, alkaline earth metal hydroxides, ammonium hydroxide or ammonia water, and alkali metal hypochlorites, without these examples being limiting. Once the pH is controlled, the solution is left to age and subsequently the solid obtained is washed, dried and subjected to a calcination process in order to activate the material prior to being used in reaction.

In an alternative embodiment, the catalyst is obtained by using hydrothermal methods (containing two or more elements in the synthesis, especially containing Sn, Nb, Ti and the element M) wherein the synthesis temperature and time can be determining. Thus, the synthesis temperature is, preferably, comprised between 100 and 250° C. and, more preferably, between 150 and 180° C. The synthesis time is, preferably, between 6 and 500 hours, even more preferably between 24 and 200 hours.

In an alternative embodiment, the catalyst is obtained by impregnating the precursors containing the elements Nb, Ti and the metal M on an $SnO_2$ material mainly having the rutile crystalline phase. As precursor compounds containing the elements Nb, Ti and the element M the following can be used: salts, oxides, hydroxides, alkoxides or mixtures of two or more of the mentioned forms. The following are preferably used as salts: sulphates, nitrates, oxalates or halides. The following can be used as solvents: water, methanol, ethanol, iso-propanol, acetonitrile, dioxane, or mixtures thereof, preferably water. The impregnation of the elements in the $SnO_2$ material can be performed by wet impregnation, impregnation at incipient volume or pore volume, without these examples being limiting. Once the impregnated solid is obtained, it is washed, dried and subjected to a calcination process in order to activate the material prior to being used in reaction.

The described catalyst can be used for the inventive method as it is obtained once it is calcined.

In an alternative embodiment, the catalyst described above can be supported and/or diluted on a solid such as: silica, alumina, titanium oxide or mixtures thereof, as well as silicon carbide. In these cases, the fixation of the different elements of the catalyst on the support can be performed by conventional impregnation methods, such as pore volume, excess solution, or, simply by precipitation on the support of a solution containing the active elements.

According to another particular embodiment of the method of the present invention, a catalyst can be used that starting from the formula with the composition $Sn_aNb_bTi_cM_dO_e$, wherein d is zero, has the following empirical formula:

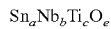

wherein:
   a is comprised between 0.05 and 10.0
   b and c are comprised between 0.0001 and 10.0, and
   e has a value which depends on the oxidation state of the elements Sn, Nb and Ti.

According to this embodiment, the catalyst must meet the condition that the catalyst comprises at least Sn, Nb and Ti, and which, in the calcined form thereof, it is presented as a mixed metal oxide mainly made up of the rutile crystalline phase of $SnO_2$ wherein at least Nb and/or Ti are incorporated.

Said catalyst can be prepared by conventional methods starting from solutions of compounds of the different elements, of solutions of the same pure elements, or a mixture thereof, with the desired atomic ratios. Said solutions are preferably aqueous solutions.

According to another particular embodiment of the present invention, the catalyst is obtained by means of a process comprising at least:
   a) a first step, of mixing compounds of the different elements, of pure elements, or a mixture thereof,
   b) a second step, of drying the solid obtained in the first step and
   c) a third step, of calcinating the dry solid obtained in the second step.

The mixing step can be performed starting from the compounds of the different elements, starting from the pure elements themselves in solution, using co-precipitation methods or by hydrothermal methods.

The elements Sn, Nb and Ti can be incorporated into the mixing step as pure metal elements, as salts, as oxides, as hydroxides, as alkoxides, or as mixtures of two or more of the mentioned forms. The following are preferably used as salts: sulphates, nitrates, oxalates or halides, without these examples being limiting.

The Sn can be incorporated into the mixing step preferably as tin oxide, tin acetate, tin nitrate, tin chloride, tin fluoride, tin isopropoxide, tin oxalate or tin sulphate.

The Nb can be incorporated into the mixing step preferably as niobium pentoxide, niobium oxalate, niobium chloride or Nb metal.

The Ti can be incorporated into the mixing step preferably as titanium dioxide, titanium oxychloride, titanium oxysulphate, titanium nitrate, titanium tetrachloride, titanium ethoxide, titanium isopropoxide, titanium butoxide or Ti metal.

The mixing step can be followed by a period of static residence in the reactor, or the mixing can be performed with stirring. Both the static residence and the stirring can be performed in a normal reactor or in an autoclave.

The mixing step can be carried out in solution or by hydrothermal treatment.

The drying step can be performed by conventional methods in the oven, evaporation with stirring, rotary evaporation, or vacuum drying.

The step of calcinating the dry solid can be performed in an atmosphere made of an inert gas, such as for example, nitrogen, helium, argon or mixtures thereof, as well as air or mixtures of air with other gases.

This calcination step can be carried out by passing a flow of inert gas (with space velocities between 1 and 400 $h^{-1}$) or statically. The temperature is preferably in a range comprised between 250 and 850° C. and more preferably between 400 and 600° C. The calcination time is not determining, but it is preferably comprised in a range between 0.5 hours and 20 hours. The heating rate is not determining, but it is preferably in a range between 0.1° C./minute and 10° C./minute. The catalyst can also be initially calcined in an oxidising atmosphere up to a temperature comprised between 200 and 350° C., and more preferably between 240 and 290° C., and subsequently be subjected to calcination in an inert atmosphere.

According to this embodiment, the catalyst is obtained, as indicated above, by co-precipitation of the elements, either from precursor compounds containing the different elements or from the pure elements themselves in solution. As precursor compounds containing the elements Sn, Nb and Ti, the following can be used: salts, oxides, hydroxides, alkoxides or mixtures of two or more of the mentioned forms. The following are preferably used as salts: sulphates, nitrates, oxalates or halides. The following can be used as solvents: water, methanol, ethanol, iso-propanol, acetonitrile, dioxane, or mixtures thereof, preferably water. The co-precipitation of the elements in the solution is performed by a controlled change in pH by adding a basic compound selected from alkali metal hydroxides, alkaline earth metal hydroxides, ammonium hydroxide or ammonia water, and alkali metal hypochlorites, without these examples being limiting. Once the pH is controlled, the solution is left to age and subsequently the solid obtained is washed, dried and subjected to a calcination process in order to activate the material prior to being used in reaction.

In an alternative embodiment, the catalyst is obtained by using hydrothermal methods (containing two or more elements in the synthesis, especially containing Sn, Nb and Ti) wherein the synthesis temperature and time can be determining. Thus, the synthesis temperature is, preferably, comprised between 100 and 250° C. and, more preferably, between 150 and 180° C. The synthesis time is, preferably, between 6 and 500 hours, even more preferably between 24 and 200 hours.

In an alternative embodiment, the catalyst is obtained by impregnating the precursors containing the elements Nb and Ti on an $SnO_2$ material mainly having the rutile crystalline phase. The following can be used as precursor compounds containing the elements Nb and Ti: salts, oxides, hydroxides, alkoxides or mixtures of two or more of the mentioned forms. The following are preferably used as salts: sulphates, nitrates, oxalates or halides. The following can be used as solvents: water, methanol, ethanol, iso-propanol, acetonitrile, dioxane, or mixtures thereof, preferably water. The impregnation of the elements in the $SnO_2$ material can be performed by wet impregnation, impregnation at incipient volume or pore volume, without these examples being limiting. Once the impregnated solid is obtained, it is washed, dried and subjected to a calcination process in order to activate the material prior to being used in reaction.

The described catalyst can be used for the inventive method as it is obtained once it is calcined.

In an alternative embodiment, the catalyst described above can be supported and/or diluted on a solid such as: silica, alumina, titanium oxide or mixtures thereof, as well as silicon carbide. In these cases, the fixation of the different elements of the catalyst on the support can be performed by conventional impregnation methods, such as pore volume, excess solution, or, simply by precipitation on the support of a solution containing the active elements.

According to another particular embodiment of the method of the present invention, a catalyst can be used that starting from the formula with the composition $Sn_aNb_bTi_cM_dO_e$, wherein c is zero, has the following empirical formula:

$$Sn_aNb_bM_dO_e$$

wherein:
- M is a chemical element from the group of transition metals, rare earth elements or lanthanides,
- a and b are comprised between 0.05 and 10,
- d is comprised between 0 and 4.0 and
- e has a value which depends on the oxidation state of the elements Sn, Nb and M.

Once again, the above formula must meet the condition that the catalyst comprises at least Sn and Nb and that, in the calcined form thereof, it is presented as a mixed metal oxide made up mainly of the rutile crystalline phase of $SnO_2$ wherein the Nb is incorporated into the structure of the rutile phase.

Said catalyst can be prepared by conventional methods starting from solutions of compounds of the different elements, of solutions of the same pure elements, or a mixture thereof, with the desired atomic ratios. Said solutions are preferably aqueous solutions.

The catalyst described in this embodiment can be obtained by means of a process comprising at least:
a) a first step, of mixing compounds of the different elements, of pure elements, or a mixture thereof,
b) a second step, of drying the solid obtained in the first step and
c) a third step, of calcinating the dry solid obtained in the second step.

The mixing step can be performed starting from the compounds of the different elements, starting from the pure elements themselves in solution, using co-precipitation methods or by hydrothermal methods.

The elements Sn, Nb and the metal M can be incorporated into the mixing step as pure metal elements, as salts, as oxides, as hydroxides, as alkoxides, or as mixtures of two or more of the mentioned forms. The following are preferably used as salts: sulphates, nitrates, oxalates or halides, without these examples being limiting.

The Sn can be incorporated into the mixing step preferably as tin oxide, tin acetate, tin nitrate, tin chloride, tin fluoride, tin isopropoxide, tin oxalate or tin sulphate.

The Nb can be incorporated into the mixing step preferably as niobium pentoxide, niobium oxalate, niobium chloride or Nb metal.

The mixing step can be followed by a period of static residence in the reactor, or the mixing can be performed with stirring. Both the static residence and the stirring can be performed in a normal reactor or in an autoclave.

The mixing step can be carried out in solution or by hydrothermal treatment.

The drying step can be performed by conventional methods in the oven, evaporation with stirring, rotary evaporation, or vacuum drying.

The step of calcinating the dry solid can be performed in an atmosphere made of an inert gas, such as for example, nitrogen, helium, argon or mixtures thereof, as well as air or mixtures of air with other gases.

This calcination step can be carried out by passing a flow of inert gas (with space velocities between 1 and 400 $h^{-1}$) or statically. The temperature is preferably in a range comprised between 250 and 850° C. and more preferably between 400 and 600° C. The calcination time is not determining, but it is preferably comprised in a range between 0.5 hours and 20 hours. The heating rate is not determining, but it is preferably in a range between 0.1° C./minute and 10° C./minute. The catalyst can also be initially calcined in an oxidising atmosphere up to a temperature comprised between 200 and 350° C., and more preferably between 240 and 290° C., and subsequently be subjected to calcination in an inert atmosphere.

According to this embodiment, the catalyst is obtained, as indicated above, by co-precipitation of the elements, either from precursor compounds containing the different elements or from the pure elements themselves in solution. As precursor compounds containing the elements Sn, Nb and the element M the following can be used: salts, oxides, hydroxides, alkoxides or mixtures of two or more of the mentioned forms. The following are preferably used as salts: sulphates, nitrates, oxalates or halides. The following can be used as solvents: water, methanol, ethanol, iso-propanol, acetonitrile, dioxane, or mixtures thereof, preferably water. The co-precipitation of the elements in the solution is performed by a controlled change in pH by adding a basic compound selected from alkali metal hydroxides, alkaline earth metal hydroxides, ammonium hydroxide or ammonia water, and alkali metal hypochlorites, without these examples being limiting. Once the pH is controlled, the solution is left to age and subsequently the solid obtained is washed, dried and subjected to a calcination process in order to activate the material prior to being used in reaction.

In an alternative embodiment, the catalyst is obtained by using hydrothermal methods (containing two or more elements in the synthesis, especially containing Sn, Nb and the element M) wherein the synthesis temperature and time can be determining. Thus, the synthesis temperature is, preferably, comprised between 100 and 250° C. and, more preferably, between 150 and 180° C. The synthesis time is, preferably, between 6 and 500 hours, even more preferably between 24 and 200 hours.

In an alternative embodiment, the catalyst is obtained by impregnating the precursors containing Nb and the metal M on an $SnO_2$ material mainly having the rutile crystalline phase. The following can be used as precursor compounds containing Nb and the element M: salts, oxides, hydroxides, alkoxides or mixtures of two or more of the mentioned forms. The following are preferably used as salts: sulphates, nitrates, oxalates or halides. The following can be used as solvents: water, methanol, ethanol, iso-propanol, acetonitrile, dioxane, or mixtures thereof, preferably water. The impregnation of the elements in the $SnO_2$ material can be performed by wet impregnation, impregnation at incipient volume or pore volume, without these examples being limiting. Once the impregnated solid is obtained, it is washed, dried and subjected to a calcination process in order to activate the material prior to being used in reaction.

The described catalyst can be used for the inventive method as it is obtained once it is calcined.

In an alternative embodiment, the catalyst described above in this invention can be supported and/or diluted on a solid such as: silica, alumina, titanium oxide or mixtures thereof, as well as silicon carbide. In these cases, the fixation of the different elements of the catalyst on the support can be performed by conventional impregnation methods, such as pore volume, excess solution, or, simply by precipitation on the support of a solution containing the active elements.

According to another particular embodiment of the method of the present invention, a catalyst can be used that starting from the formula with the composition $Sn_aNb_bTi_cM_dO_e$, wherein c and d are zero, has the following empirical formula:

wherein:
  a and b are comprised between 0.05 and 10.0, and
  e has a value which depends on the oxidation state of the elements Sn and Nb.

Once again with the condition that the catalyst comprises at least Sn and Nb and that, in the calcined form thereof, it is presented as a mixed metal oxide made up mainly of the rutile crystalline phase of $SnO_2$ wherein the Nb is incorporated into the structure of the rutile phase.

Said catalyst can be prepared by conventional methods starting from solutions of compounds of the different elements, of solutions of the same pure elements, or a mixture thereof, with the desired atomic ratios. Said solutions are preferably aqueous solutions.

The catalyst is obtained by means of a process comprising at least:
  a) a first step, of mixing compounds of the different elements, of pure elements, or a mixture thereof,
  b) a second step, of drying the solid obtained in the first step and
  c) a third step, of calcinating the dry solid obtained in the second step.

The mixing step can be performed starting from the compounds of the different elements, starting from the pure elements themselves in solution, using co-precipitation methods or by hydrothermal methods.

The elements Sn and Nb can be incorporated into the mixing step as pure metal elements, as salts, as oxides, as hydroxides, as alkoxides, or as mixtures of two or more of the mentioned forms. The following are preferably used as salts: sulphates, nitrates, oxalates or halides, without these examples being limiting.

The Sn can be incorporated into the mixing step preferably as tin oxide, tin acetate, tin nitrate, tin chloride, tin fluoride, tin isopropoxide, tin oxalate or tin sulphate.

The Nb can be incorporated into the mixing step preferably as niobium pentoxide, niobium oxalate, niobium chloride or Nb metal.

The mixing step can be followed by a period of static residence in the reactor, or the mixing can be performed with stirring. Both the static residence and the stirring can be performed in a normal reactor or in an autoclave.

The mixing step can be carried out in solution or by hydrothermal treatment.

The drying step can be performed by conventional methods in the oven, evaporation with stirring, rotary evaporation, or vacuum drying.

The step of calcinating the dry solid can be performed in an atmosphere made of an inert gas, such as for example, nitrogen, helium, argon or mixtures thereof, as well as air or mixtures of air with other gases.

This calcination step can be carried out by passing a flow of inert gas (with space velocities between 1 and 400 $h^{-1}$) or statically. The temperature is preferably in a range comprised between 250 and 850° C. and more preferably between 400 and 600° C. The calcination time is not determining, but it is preferably comprised in a range between 0.5 hours and 20 hours. The heating rate is not determining, but it is preferably in a range between 0.1° C./minute and 10° C./minute. The catalyst can also be initially calcined in an oxidising atmosphere up to a temperature comprised between 200 and 350° C., and more preferably between 240 and 290° C., and subsequently be subjected to calcination in an inert atmosphere.

According to this embodiment, the catalyst is obtained, as indicated above, by co-precipitation of the elements, either from precursor compounds containing the different elements or from the pure elements themselves in solution. The following can be used as precursor compounds containing the elements Sn and Nb: salts, oxides, hydroxides, alkoxides or mixtures of two or more of the mentioned forms. The following are preferably used as salts: sulphates, nitrates, oxalates or halides. The following can be used as solvents: water, methanol, ethanol, iso-propanol, acetonitrile, dioxane, or mixtures thereof, preferably water. The co-precipitation of the elements in the solution is performed by a controlled change in pH by adding a basic compound selected from alkali metal hydroxides, alkaline earth metal hydroxides, ammonium hydroxide or ammonia water, and alkali metal hypochlorites, without these examples being limiting. Once the pH is controlled, the solution is left to age and subsequently the solid obtained is washed, dried and subjected to a calcination process in order to activate the material prior to being used in reaction.

In an alternative embodiment, the catalyst is obtained by using hydrothermal methods (containing at least two elements in the synthesis, especially Sn and Nb) wherein the synthesis temperature and time can be determining. Thus, the synthesis temperature is, preferably, comprised between 100 and 250° C. and, more preferably, between 150 and 180° C. The synthesis time is, preferably, between 6 and 500 hours, even more preferably between 24 and 200 hours.

In an alternative embodiment, the catalyst is obtained by impregnating the precursors containing Nb on an $SnO_2$ material mainly having the rutile phase. The following can be used as precursor compounds containing Nb: salts, oxides, hydroxides, alkoxides or mixtures of two or more of the mentioned forms. The following are preferably used as salts: sulphates, nitrates, oxalates or halides. The following can be used as solvents: water, methanol, ethanol, iso-propanol, acetonitrile, dioxane, or mixtures thereof, preferably water. The impregnation of the Nb in the $SnO_2$ material can be performed by wet impregnation, impregnation at incipient volume or pore volume, without these examples being limiting. Once the impregnated solid is obtained, it is washed, dried and subjected to a calcination process in order to activate the material prior to being used in reaction.

The described catalyst can be used for the inventive method as it is obtained once it is calcined.

According to an alternative embodiment, the catalyst described above in this invention can be supported and/or diluted on a solid such as: silica, alumina, titanium oxide or mixtures thereof, as well as silicon carbide. In these cases, the fixation of the different elements of the catalyst on the support can be performed by conventional impregnation methods, such as pore volume, excess solution, or, simply by precipitation on the support of a solution containing the active elements.

According to another particular embodiment of the method of the present invention, a catalyst can be used that starting from the formula with the composition $Sn_aNb_bTi_cM_dO_e$, wherein b is zero, has the following empirical formula:

$$Sn_aTi_cM_dO_e$$

wherein:
M is a chemical element from the group of transition metals, rare earth elements or lanthanides,
a and c are comprised between 0.05 and 10,
d is comprised between 0 and 4.0 and
e has a value which depends on the oxidation state of the elements Sn, Ti and M.

Once again, the above formula must meet the condition that the catalyst comprises at least Sn and Ti and that, in the calcined form thereof, it is presented as a mixed metal oxide made up mainly of the rutile crystalline phase of $SnO_2$ wherein the Ti is incorporated into the structure of the rutile phase.

Said catalyst can be prepared by conventional methods starting from solutions of compounds of the different elements, of solutions of the same pure elements, or a mixture thereof, with the desired atomic ratios. Said solutions are preferably aqueous solutions.

The catalyst described in this embodiment can be obtained by means of a process comprising at least:
a) a first step, of mixing compounds of the different elements, of pure elements, or a mixture thereof,
b) a second step, of drying the solid obtained in the first step and
c) a third step, of calcinating the dry solid obtained in the second step.

The mixing step can be performed starting from the compounds of the different elements, starting from the pure elements themselves in solution, using co-precipitation methods or by hydrothermal methods.

The elements Sn, Ti and the metal M can be incorporated into the mixing step as pure metal elements, as salts, as oxides, as hydroxides, as alkoxides, or as mixtures of two or more of the mentioned forms. The following are preferably used as salts: sulphates, nitrates, oxalates or halides, without these examples being limiting.

The Sn can be incorporated into the mixing step preferably as tin oxide, tin acetate, tin nitrate, tin chloride, tin fluoride, tin isopropoxide, tin oxalate or tin sulphate.

The Ti can be incorporated into the mixing step preferably as titanium dioxide, titanium oxychloride, titanium oxysulphate, titanium nitrate, titanium tetrachloride, titanium ethoxide, titanium isopropoxide, titanium butoxide or Ti metal.

The mixing step can be followed by a period of static residence in the reactor, or the mixing can be performed with stirring. Both the static residence and the stirring can be performed in a normal reactor or in an autoclave.

The mixing step can be carried out in solution or by hydrothermal treatment.

The drying step can be performed by conventional methods in the oven, evaporation with stirring, rotary evaporation, or vacuum drying.

The step of calcinating the dry solid can be performed in an atmosphere made of an inert gas, such as for example, nitrogen, helium, argon or mixtures thereof, as well as air or mixtures of air with other gases.

This calcination step can be carried out by passing a flow of inert gas (with space velocities between 1 and 400 $h^{-1}$) or statically. The temperature is preferably in a range comprised between 250 and 850° C. and more preferably between 400 and 600° C. The calcination time is not determining, but it is preferably comprised in a range between 0.5 hours and 20 hours. The heating rate is not determining, but it is preferably in a range between 0.1° C./minute and 10° C./minute. The catalyst can also be initially calcined in an oxidising atmosphere up to a temperature comprised between 200 and 350° C., and more preferably between 240 and 290° C., and subsequently be subjected to calcination in an inert atmosphere.

According to this embodiment, the catalyst is obtained, as indicated above, by co-precipitation of the elements, either from precursor compounds containing the different elements or from the pure elements themselves in solution. As precursor compounds containing the elements Sn, Ti and the element M the following can be used: salts, oxides, hydroxides, alkoxides or mixtures of two or more of the mentioned forms. The following are preferably used as salts: sulphates, nitrates, oxalates or halides. The following can be used as solvents: water, methanol, ethanol, iso-propanol, acetonitrile, dioxane, or mixtures thereof, preferably water. The co-precipitation of the elements in the solution is performed by a controlled change in pH by adding a basic compound selected from alkali metal hydroxides, alkaline earth metal hydroxides, ammonium hydroxide or ammonia water, and alkali metal hypochlorites, without these examples being limiting. Once the pH is controlled, the solution is left to age and subsequently the solid obtained is washed, dried and subjected to a calcination process in order to activate the material prior to being used in reaction.

In an alternative embodiment, the catalyst is obtained by using hydrothermal methods (containing two or more elements in the synthesis, especially containing Sn, Ti and the element M) wherein the synthesis temperature and time can be determining. Thus, the synthesis temperature is, preferably, comprised between 100 and 250° C. and, more preferably, between 150 and 180° C. The synthesis time is, preferably, between 6 and 500 hours, even more preferably between 24 and 200 hours.

In an alternative embodiment, the catalyst is obtained by impregnating the precursors containing Ti and the metal M on an $SnO_2$ material mainly having the rutile crystalline phase. The following can be used as precursor compounds containing Ti and the element M: salts, oxides, hydroxides, alkoxides or mixtures of two or more of the mentioned forms. The following are preferably used as salts: sulphates, nitrates, oxalates or halides. The following can be used as solvents: water, methanol, ethanol, iso-propanol, acetonitrile, dioxane, or mixtures thereof, preferably water. The impregnation of the elements in the $SnO_2$ material can be performed by wet impregnation, impregnation at incipient volume or pore volume, without these examples being limiting. Once the impregnated solid is obtained, it is washed, dried and subjected to a calcination process in order to activate the material prior to being used in reaction.

The described catalyst can be used for the inventive method as it is obtained once it is calcined.

In an alternative embodiment, the catalyst described above in this invention can be supported and/or diluted on a solid such as: silica, alumina, titanium oxide or mixtures thereof, as well as silicon carbide. In these cases, the fixation of the different elements of the catalyst on the support can be performed by conventional impregnation methods, such as pore volume, excess solution, or, simply by precipitation on the support of a solution containing the active elements.

According to another particular embodiment of the method of the present invention, a catalyst can be used that starting from the formula with the composition $Sn_aNb_bTi_cM_dO_e$, wherein b and d are zero, has the following empirical formula:

$$Sn_aTi_cO_e$$

wherein:
 a and c are comprised between 0.05 and 10, and
 e has a value which depends on the oxidation state of the elements Sn and Ti.

With the condition that the catalyst comprises at least Sn and Ti and that, in the calcined form thereof, it is presented as a mixed metal oxide made up mainly of the rutile crystalline phase of $SnO_2$ wherein the Ti is incorporated into the structure of the rutile phase.

Said catalyst can be prepared by conventional methods starting from solutions of compounds of the different elements, of solutions of the same pure elements, or a mixture of both, with the desired atomic ratios. Said solutions are preferably aqueous solutions.

According to this embodiment, the catalyst can be obtained by a process comprising at least:
 a) a first step, of mixing compounds of the different elements, of pure elements, or a mixture of both,
 b) a second step, of drying the solid obtained in the first step and
 c) a third step, of calcinating the dry solid obtained in the second step.

The mixing step can be performed starting from the compounds of the different elements, starting from the pure elements themselves in solution, using co-precipitation methods or by hydrothermal methods.

The elements Sn and Ti can be incorporated into the mixing step as pure metal elements, as salts, as oxides, as hydroxides, as alkoxides, or as mixtures of two or more of the mentioned forms. The following are preferably used as salts: sulphates, nitrates, oxalates or halides, without these examples being limiting.

The Sn can be incorporated into the mixing step preferably as tin oxide, tin acetate, tin nitrate, tin chloride, tin fluoride, tin isopropoxide, tin oxalate or tin sulphate.

The Ti can be incorporated into the mixing step preferably as titanium dioxide, titanium oxychloride, titanium oxysulphate, titanium nitrate, titanium tetrachloride, titanium ethoxide, titanium isopropoxide, titanium butoxide or Ti metal.

The mixing step can be followed by a period of static residence in the reactor, or the mixing can be performed with stirring. Both the static residence and the stirring can be performed in a normal reactor or in an autoclave.

The mixing step can be carried out in solution or by hydrothermal treatment.

The drying step can be performed by conventional methods in the oven, evaporation with stirring, rotary evaporation, or vacuum drying.

The step of calcinating the dry solid can be performed in an atmosphere made of an inert gas, such as for example, nitrogen, helium, argon or mixtures thereof, as well as air or mixtures of air with other gases.

This calcination step can be carried out by passing a flow of inert gas (with space velocities between 1 and 400 $h^{-1}$) or statically. The temperature is preferably in a range comprised between 250 and 850° C. and more preferably between 400 and 600° C. The calcination time is not determining, but it is preferably comprised in a range between 0.5 hours and 20 hours. The heating rate is not determining, but it is preferably in a range between 0.1° C./minute and 10° C./minute. The catalyst can also be initially calcined in an oxidising atmosphere up to a temperature comprised between 200 and 350° C., and more preferably between 240 and 290° C., and subsequently be subjected to calcination in an inert atmosphere.

According to this embodiment, the catalyst is obtained, as indicated above, by co-precipitation of the elements, either from precursor compounds containing the different elements or from the pure elements themselves in solution. The following can be used as precursor compounds containing the elements Sn and Ti: salts, oxides, hydroxides, alkoxides or mixtures of two or more of the mentioned forms. The following are preferably used as salts: sulphates, nitrates, oxalates or halides. The following can be used as solvents: water, methanol, ethanol, iso-propanol, acetonitrile, dioxane, or mixtures thereof, preferably water. The co-precipitation of the elements in the solution is performed by a controlled change in pH by adding a basic compound selected from alkali metal hydroxides, alkaline earth metal hydroxides, ammonium hydroxide or ammonia water, and alkali metal hypochlorites, without these examples being limiting. Once the pH is controlled, the solution is left to age and subsequently the solid obtained is washed, dried and subjected to a calcination process in order to activate the material prior to being used in reaction.

In an alternative embodiment, the catalyst is obtained by using hydrothermal methods (containing at least two elements in the synthesis, especially Sn and Ti) wherein the synthesis temperature and time can be determining. Thus, the synthesis temperature is, preferably, comprised between 100 and 250° C. and, more preferably, between 150 and 180° C. The synthesis time is, preferably, between 6 and 500 hours, even more preferably between 24 and 200 hours.

In an alternative embodiment, the catalyst is obtained by impregnating the precursors of Ti on an $SnO_2$ material mainly having the rutile crystalline phase. The following can be used as precursor compounds containing Ti: salts, oxides, hydroxides, alkoxides or mixtures of two or more of the mentioned forms. The following are preferably used as salts: sulphates, nitrates, oxalates or halides. The following can be used as solvents: water, methanol, ethanol, iso-propanol, acetonitrile, dioxane, or mixtures thereof, preferably water. The impregnation of the elements in the $SnO_2$ material can be performed by wet impregnation, impregnation at incipient volume or pore volume, without these examples being limiting. Once the impregnated solid is obtained, it is washed, dried and subjected to a calcination process in order to activate the material prior to being used in reaction.

The catalyst described according to this embodiment can be used for the inventive method as it is obtained once it is calcined.

In an alternative embodiment, the catalyst described above in this invention can be supported and/or diluted on a solid such as: silica, alumina, titanium oxide or mixtures thereof, as well as silicon carbide. In these cases, the fixation of the different elements of the catalyst on the support can be performed by conventional impregnation methods, such as pore volume, excess solution, or, simply by precipitation on the support of a solution containing the active elements.

The method of the present invention has the following advantages with respect to the state of the art:
catalysts comprising Sn and Nb, Sn and Ti, and combinations of Sn—Nb or Sn—Ti with other elements, wherein at least Sn and Nb or Sn and Ti are present in the form of a mixed oxide, provide higher yields to C5-C8 hydrocarbons than those reported with Ce—Zr-based catalysts, with total yields (≈20%) comparable to those observed for these Ce—Zr materials;
they are more stable and resistant under reaction conditions than other reported catalytic materials;
they require a lower temperature to perform the method when compared with data reported in literature for other catalytic materials.

According to the present invention, the metal M may be selected from the group of transition metals, preferably V, Cr, Fe, Co, Ni, Cu, Zn, Mo, Ta, Ti, Re and combinations thereof; as well as rare earth elements and lanthanides, preferably La.

According to a particular embodiment, the metal M is selected from V, Mn, Cu, Zn, La and combinations thereof.

According to the method of the present invention, at the end thereof, mixtures of hydrocarbons and aromatic compounds with between 5 and 16 C atoms can be obtained.

According to a particular embodiment, the product obtained can be selected from aliphatic hydrocarbons that are linear, branched, cyclic with between 5 to 16 C atoms, further being able to contain between 0 and 4 O atoms, and more preferably between 0 and 2 O atoms.

According to another particular embodiment, the product obtained can be selected from aromatic compounds with between 5 and 16 C atoms, it can also contain between 0 and 4 O atoms.

In the method of the present invention, the aqueous mixture derived from the biomass which is introduced in the first step can contain oxygenated organic compounds that have between 1 and 12 carbon atoms, preferably between 1 and 9 carbon atoms, and furthermore, they can have between 1 and 9 oxygen atoms, preferably between 1 and 6 oxygen atoms.

According to the present invention, the total concentration of the oxygenated organic compounds present in the aqueous mixture derived from the biomass is preferably in a range comprised between 0.5 and 99.5% by weight, and more preferably between 1.0 and 70.0% by weight.

In the process described according to the present invention, the contact between the aqueous mixture and the catalyst is performed in a reactor preferably selected from among a batch reactor, a continuous stirred-tank reactor, a continuous fixed-bed reactor and a continuous fluidised-bed reactor.

According to a particular embodiment, the reactor is a batch reactor and the reaction is performed in the liquid phase at a pressure preferably selected between 1 to 80 bar, and more preferably at a pressure between 1 and 50 bar. Furthermore, the reaction can be carried out at a temperature between 100° C. and 350° C., preferably between 140° C. and 280° C. The contact time between the aqueous mixture containing the oxygenated organic compounds derived from the biomass and the catalyst can range from 2 minutes to 200 hours, preferably between 1 hour and 100 hours. According to this particular embodiment, the weight ratio between the aqueous mixture containing the oxygenated compounds derived from the biomass and the catalyst can preferably be between 1 and 200, and more preferably between 2.5 and 100.

According to another particular embodiment, the reactor used in the method of the present invention can be a fixed-bed reactor or a fluidised-bed reactor. In this case, the reaction temperature is preferably comprised in a range between 100° C. and 350° C. and more preferably between 150° C. and 300° C.; the contact time (W/F) is comprised between 0.001 and 200 s; and the working pressure between 1 and 100 bar and more preferably between 1 and 60 bar.

According to the method described above, the contact between the aqueous fraction containing the oxygenated organic compounds and the catalyst can be carried out under an atmosphere made of nitrogen, argon, an atmosphere made of air, nitrogen-enriched air, argon-enriched air, or combinations thereof.

According to a particular embodiment, the process is preferably carried out under an atmosphere made of nitrogen.

According to another particular embodiment, the process is preferably carried out in an atmosphere made of air or nitrogen-enriched air.

As discussed, the present invention describes the use of the catalyst obtained as described above in order to obtain mixtures of hydrocarbons and aromatic compounds, preferably between 5 and 16 C atoms (C5-C16) useful in liquid fuels, from the catalytic conversion of oxygenated organic compounds present in aqueous fractions derived from the biomass.

The aqueous fractions derived from the biomass containing different oxygenated organic compounds to be treated by the method of the present invention may be selected from among the aqueous fractions obtained by liquid-liquid separation of the bioliquids produced by thermal and/or catalytic pyrolysis of biomass, aqueous fractions obtained by chemical and/or enzymatic hydrolysis of biomass, aqueous fractions obtained by liquefaction under sub- or super-critical conditions of biomass, and aqueous fractions obtained from the fermentation of biomass for the selective production of ethanol, butanol, succinic acid, and lactic acid, without these examples being limiting.

The aqueous fractions derived from the biomass to be treated by the method of the present invention may contain different oxygenated organic compounds having between 1 and 12 Carbon atoms, preferably between 1 and 9 Carbon atoms.

Furthermore, the aqueous fractions derived from the biomass to be treated by the method of the present invention may contain different oxygenated organic compounds having between 1 and 9 Oxygen atoms, preferably between 1 and 60 atoms.

The aqueous fractions derived from the biomass to be treated by the method of the present invention may contain different oxygenated organic compounds in concentrations between 0.5 and 99.5% by weight with respect to the amount of water, preferably between 1.0 and 70.0% by weight with respect to the amount of water.

According to a particular embodiment, the aqueous fractions derived from the biomass to be treated by the method of the present invention may contain different oxygenated organic compounds, among them alcohols, aldehydes, ketones, acids and carboxylic diacids, esters, ethers, diols, triols and polyalcohols in general, sugars, furan derivatives, and phenolic derivatives, without these examples being limiting.

According to another particular embodiment, the aqueous fractions derived from the biomass to be treated by the method of the present invention may contain different oxygenated organic compounds that are alcohols, among them methanol, ethanol, 1-propanol, 2-propanol, 1-butanol, 2-butanol, 1-pentanol, 2-pentanol, iso-pentanol, 1-hexanol, 2-hexanol, 3-hexanol, and furfuryl alcohol, without these examples being limiting.

According to another particular embodiment, the aqueous fractions derived from the biomass to be treated by the method of the present invention may contain different oxygenated organic compounds that are aldehydes, among them formaldehyde, acetaldehyde, propanal, butanal, 2-butenal, pentanal, 2-pentenal, 3-pentenal, hexanal, 2-hexenal, 3-hexenal, 2-methyl-2-pentenal, 2-methyl-3-pentenal, 3-methyl-2-pentenal, furfural, and 5-hydroxy-methyl-furfural, without these examples being limiting.

According to another particular embodiment, the aqueous fractions derived from the biomass to be treated by the method of the present invention may contain different oxygenated organic compounds that are ketones, among them acetone, 2-butanone, 2-pentanone, penten-2-one, 3-pentanone, penten-3-one, 2-hexanone, hexen-2-one, 3-hexanone, hexen-3-one, isophorone, vanillin, aceto-vanillin, syringone, and acetosyringone, without these examples being limiting.

According to another particular embodiment, the aqueous fractions derived from the biomass to be treated by the method of the present invention may contain different oxygenated organic compounds that are acids and diacids, among them acetic acid, propionic acid, butyric acid, pentanoic acid, hexanoic acid, lactic acid, pyruvic acid, levulinic acid, tartronic acid, tartaric acid, glycolic acid, succinic acid, gluconic acid, and glucaric acid, without these examples being limiting.

According to another particular embodiment, the aqueous fractions derived from the biomass to be treated by the method of the present invention may contain different oxygenated organic compounds that are esters, among them methyl acetate, ethyl acetate, propyl acetate, butyl acetate, methyl propionate, ethyl propionate, propyl propionate, butyl propionate, methyl butyrate, ethyl butyrate, propyl butyrate, and butyl butyrate, without these examples being limiting.

According to another particular embodiment, the aqueous fractions derived from the biomass to be treated by the method of the present invention may contain different oxygenated organic compounds that are ethers, among them dimethyl ether, diethyl ether, dipropyl ether, diisopropyl ether, dibutyl ether, di-sec-butyl ether, methyl ethyl ether, methyl propyl ether, methyl isopropyl ether, methyl butyl ether, methyl-sec-butyl ether, ethyl propyl ether, ethyl isopropyl ether, ethyl butyl ether, ethyl-sec-butyl ether, propyl butyl ether, and propyl-sec-butyl ether, without these examples being limiting.

According to another particular embodiment, the aqueous fractions derived from the biomass to be treated by the method of the present invention may contain different oxygenated organic compounds that are diols, among them ethylene glycol, 1,2-propanediol, 1,3-propanediol, 1,2-butanediol, 1,3-butanediol, 1,4-butanediol, 2,3-butanediol, 1,2-pentanediol, 1,3-pentanediol, 1,4-pentanediol, 1,5-pentanediol, 2,3-pentanediol, 2,4-pentanediol, 1,2-hexanediol, 1,3-hexanediol, 1,4-hexanediol, 1,6-hexanediol, 2,3-hexanediol, 2,4-hexanediol; triols, among them glycerol, 1,2,3-butanetriol, 1,2,4-butanetriol, 1,2,3-pentanetriol, 1,2,4-pentanetriol, 1,2,3-hexanetriol, 1,2,4-hexanetriol, 1,2,5-hexanetriol, 1,2,6-hexanetriol, 2,3,4-hexanetriol, 2,3,5-hexanetriol, 2,3,6-hexanetriol, 1,3,6-hexanetriol, 1,4,6-hexanetriol; and polyalcohols, among them, mono-sugars which are glucose, fructose, and arabinose, without these examples being limiting.

According to another particular embodiment, the aqueous fractions derived from the biomass to be treated by the method of the present invention may contain different oxygenated organic compounds that are furan derivatives, among them furan, 2-methyl-furan, 5-methyl-furan, 2,5-dimethyl-furan, 2-ethyl-furan, 5-ethyl-furan, 2,5-diethyl-furan, benzofuran, methyl-benzofuran, ethyl-benzofuran, without these examples being limiting.

the aqueous fractions derived from the biomass to be treated by the method of the present invention may contain different oxygenated organic compounds that are phenol derivatives, among them phenol, benzyl alcohol, acetol, o-Cresol, m-Cresol, p-Cresol, guaiacol, vanillin alcohol, syringol, and aceto-syringol, without these examples being limiting.

The mixtures of organic compounds with between 5 and 16 C atoms (C5-C16) obtained as a product of the conversion of the oxygenated compounds present in aqueous fractions derived from biomass may contain aliphatic hydrocarbon compounds which are linear, branched, cyclic with between 5 to 16 C atoms, also being able to contain between 0 and 40 atoms, preferably between 0 and 20 atoms.

The mixtures of organic compounds with between 5 and 16 C atoms (C5-C16) obtained as a product of the conversion of the oxygenated compounds present in aqueous fractions derived from biomass may contain aromatic compounds with between 5 and 16 C atoms, also being able to contain between 0 and 40 atoms, preferably between 0 and 20 atoms. These aromatic compounds may have one, two, or more substituents in the ring, these substituents being able to be linear, branched and/or cyclical alkyls, linear, branched and/or cyclical alkoxide, acetyl, tetrahydrofuran, furan, and aromatic, without these examples being limiting.

Unless defined otherwise, all technical and scientific terms used herein have the same meaning that is commonly understood by a person with skill in the art to which the present invention belongs. Methods and materials similar or equivalent to those described herein may be used in the practice of the present invention. Throughout the description and claims, the word "comprises" and its variations are not intended to exclude other technical features, additives, components or steps. Additional objects, advantages and features of the invention will be apparent to those with skill in the art upon examination of the description or may be learnt by practice of the invention. The following examples and graphs are provided by way of illustration and are not intended to be limiting for the present invention.

BRIEF DESCRIPTION OF THE GRAPHS

EXAMPLES

Next, the inventors will illustrate the invention by means of different tests that demonstrate the preparation of the catalysts and the application thereof in the process of the invention.

Example 1. Preparation of a Catalyst by Co-Precipitation Method, Based on Tin Oxide [SnO$_2$]

Figure 1:
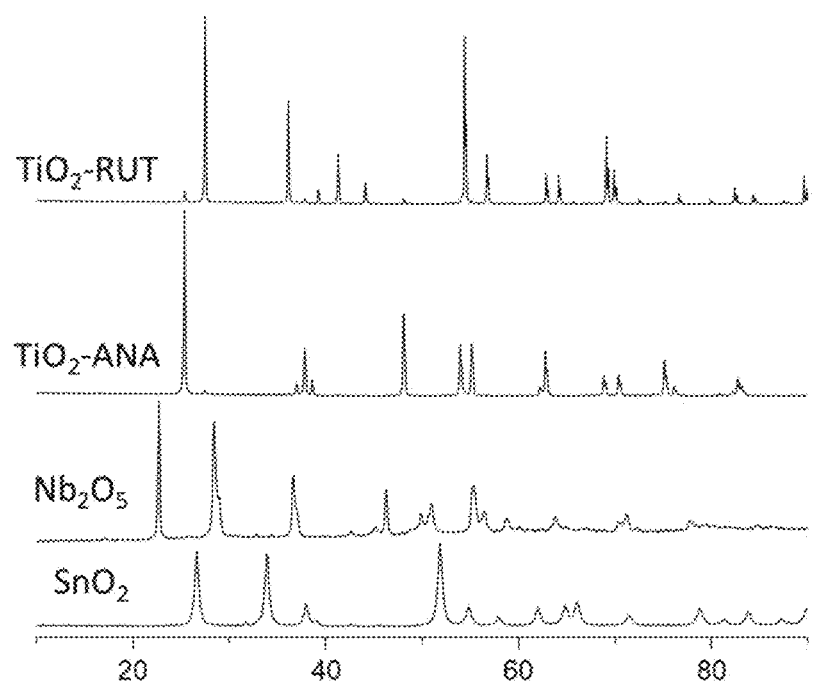
FIG. 1 shows X-ray diffractograms of catalysts based on commercial oxides of Sn [$SnO_2$], Nb [$Nb_2O_5$] and Ti [$TiO_2$-Anatase] and [$TiO_2$-Rutile].
Figure 2:
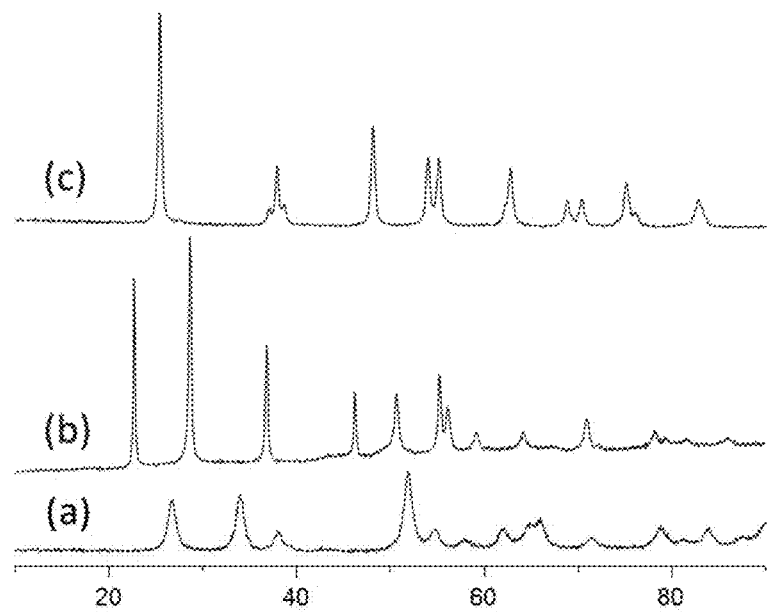
FIG. 2 shows X-ray diffractograms of catalysts based on oxides of Sn (a) [SnO$_2$], Nb (b) [Nb$_2$O$_5$] and Ti (c) [TiO$_2$] prepared by co-precipitation described in examples 1, 2 and 3, respectively.

14.72 g of tin (IV) chloride pentahydrate are added in 200.0 ml of water, which are kept under stirring until the complete dissolution thereof. Next, a 28% NH$_4$OH solution is added dropwise until reaching pH=9. The resulting gel is transferred to a container where it is left to age for 24 h at room temperature. After a washing and filtering step, the solid is dried at 100° C. overnight. Lastly, the solid obtained is heated at 600° C. for 2 h in a stream of air in order to obtain the catalyst. This catalyst presents a characteristic X-ray diffractogram like the one shown in FIG. 2a.

Example 2. Preparation of a Catalyst by Co-Precipitation Method, Based on Niobium Oxide [Nb$_2$O$_5$]

In 200.0 ml of water, 12.73 g of niobium oxalate are added, which are kept under stirring until the complete dissolution thereof. Next, a 28% NH$_4$OH solution is added dropwise until reaching pH=9. The resulting gel is transferred to a container where it is left to age for 24 h at room temperature. After a washing and filtering step, the solid is dried at 100° C. overnight. Lastly, the solid obtained is heated at 600° C. for 2 h in a stream of air in order to obtain the catalyst. This catalyst presents a characteristic X-ray diffractogram like the one shown in FIG. 2b.

Example 3. Preparation of a Catalyst by Co-Precipitation Method, Based on Titanium Oxide [TiO$_2$]

8.48 ml of an aqueous solution of titanium oxychloride with hydrochloric acid are added to 200.0 ml of water, which are kept under stirring until the complete homogenisation thereof. Next, a 28% NH$_4$OH solution is added dropwise until reaching pH=9. The resulting gel is transferred to a container where it is left to age for 24 h at room temperature. After a washing and filtering step, the solid is dried at 100° C. overnight. Lastly, the solid obtained is heated at 600° C. for 2 h in a stream of air in order to obtain the catalyst. This catalyst presents a characteristic X-ray diffractogram like the one shown in FIG. 2c.

Example 4. Preparation of a Catalyst by Co-Precipitation Method, Based on Tin and Niobium Oxides with a Molar Ratio Sn/Nb=0.77 [Sn—Nb—O (0.77)]

Figure 3:
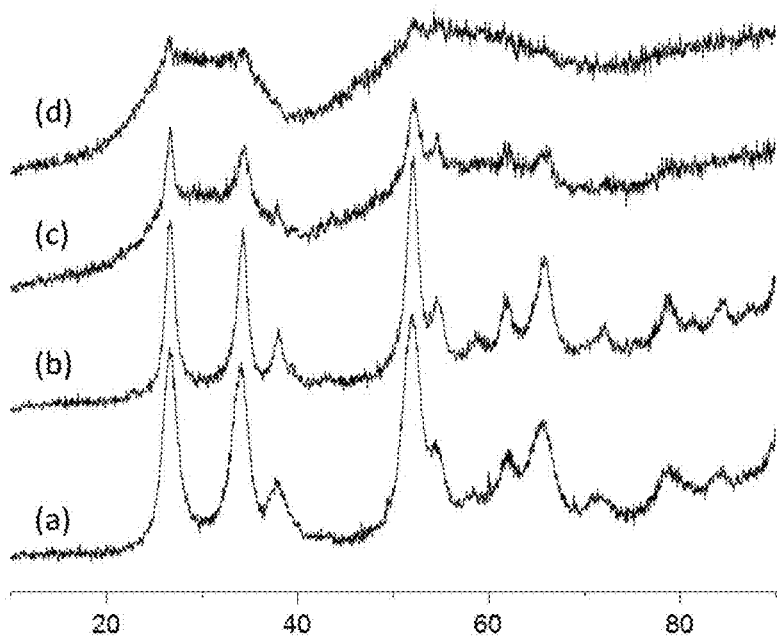
FIG. 3 shows X-ray diffractograms of catalysts based on oxides of tin and niobium [Sn—Nb—O] described in examples 4 to 7.

9.82 g of tin (IV) chloride pentahydrate and 4.24 g of niobium oxalate are added to 200.0 ml of water, which are kept under stirring until the complete dissolution thereof. Next, a 28% NH$_4$OH solution is added dropwise until reaching pH=9. The resulting gel is transferred to a container where it is left to age for 24 h at room temperature. After a washing and filtering step, the solid is dried at 100° C. overnight. Lastly, the solid obtained is heated at 600° C. for 2 h in a stream of air in order to obtain the catalyst. This catalyst presents a characteristic X-ray diffractogram like the one shown in FIG. 3a.

Example 5. Preparation of a Catalyst by Co-Precipitation Method, Based on Tin and Niobium Oxides with a Molar Ratio Sn/Nb=0.58 [Sn—Nb—O (0.58)]

7.01 g of tin (IV) chloride pentahydrate and 6.06 g of niobium oxalate are added to 200.0 ml of water, which are kept under stirring until the complete dissolution thereof. Next, a 28% NH$_4$OH solution is added dropwise until reaching pH=9. The resulting gel is transferred to a container where it is left to age for 24 h at room temperature. After a washing and filtering step, the solid is dried at 100° C. overnight. Lastly, the solid obtained is heated at 600° C. for 2 h in a stream of air in order to obtain the catalyst. This catalyst presents a characteristic X-ray diffractogram like the one shown in FIG. 3b.

Example 6. Preparation of a Catalyst by Co-Precipitation Method, Based on Tin and Niobium Oxides with a Molar Ratio Sn/Nb=0.43 [Sn—Nb—O (0.43)]

4.91 g of tin (IV) chloride pentahydrate and 8.48 g of niobium oxalate are added to 200.0 ml of water, which are kept under stirring until the complete dissolution thereof. Next, a 28% NH$_4$OH solution is added dropwise until reaching pH=9. The resulting gel is transferred to a container where it is left to age for 24 h at room temperature. After a washing and filtering step, the solid is dried at 100° C. overnight. Lastly, the solid obtained is heated at 600° C. for 2 h in a stream of air in order to obtain the catalyst. This catalyst presents a characteristic X-ray diffractogram like the one shown in FIG. 3c.

Example 7. Preparation of a Catalyst by Co-Precipitation Method, Based on Tin and Niobium Oxides with a Molar Ratio Sn/Nb=0.29 [Sn—Nb—O (0.29)]

3.51 g of tin (IV) chloride pentahydrate and 12.12 g of niobium oxalate are added to 200.0 ml of water, which are kept under stirring until the complete dissolution thereof. Next, a 28% NH$_4$OH solution is added dropwise until reaching pH=9. The resulting gel is transferred to a container where it is left to age for 24 h at room temperature. After a washing and filtering step, the solid is dried at 100° C. overnight. Lastly, the solid obtained is heated at 600° C. for 2 h in a stream of air in order to obtain the catalyst. This catalyst presents a characteristic X-ray diffractogram like the one shown in FIG. 3d.

Example 8. Preparation of a Catalyst by Co-Precipitation Method, Based on Tin and Niobium Oxides with a Molar Ratio Sn/Ti=0.74 [Sn—Ti—O (0.74)]

Figure 4:
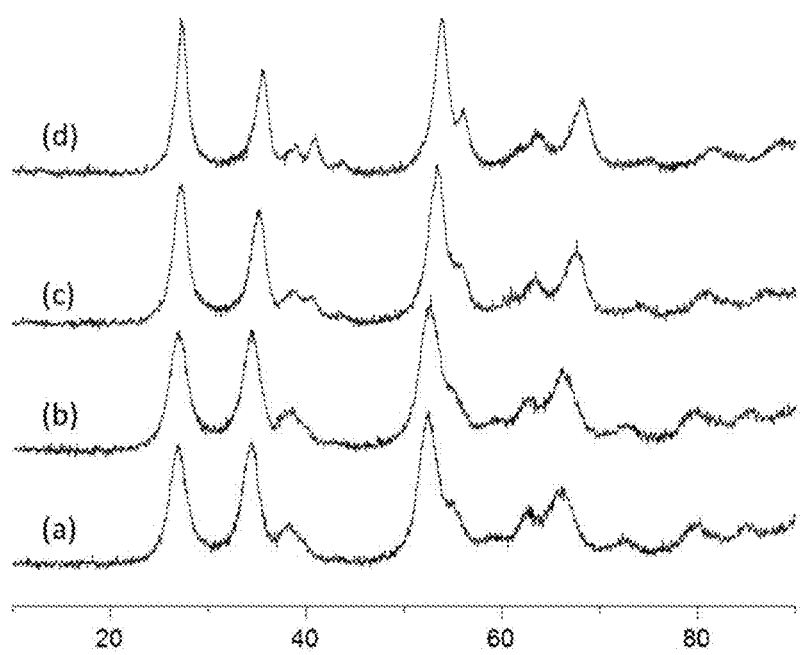
FIG. 4 shows X-ray diffractograms of catalysts based on oxides of tin and titanium [Sn—Ti—O] described in examples 8 to 11.

14.02 g of tin (IV) chloride pentahydrate and 2.02 ml of an aqueous solution of titanium oxychloride with hydrochloric acid are added in 200.0 ml of water, which are kept under stirring until the complete dissolution thereof. Next, a 28% NH$_4$OH solution is added dropwise until reaching pH=9. The resulting gel is transferred to a container where it is left to age for 24 h at room temperature. After a washing and filtering step, the solid is dried at 100° C. overnight. Lastly, the solid obtained is heated at 600° C. for 2 h in a stream of air in order to obtain the catalyst. This catalyst presents a characteristic X-ray diffractogram like the one shown in FIG. 4a.

Example 9. Preparation of a Catalyst by Co-Precipitation Method, Based on Tin and Niobium Oxides with a Molar Ratio Sn/Ti=0.64 [Sn—Ti—O (0.64)]

9.82 g of tin (IV) chloride pentahydrate and 2.84 ml of an aqueous solution of titanium oxychloride with hydrochloric acid are added in 200.0 ml of water, which are kept under stirring until the complete dissolution thereof. Next, a 28% NH$_4$OH solution is added dropwise until reaching pH=9. The resulting gel is transferred to a container where it is left to age for 24 h at room temperature. After a washing and filtering step, the solid is dried at 100° C. overnight. Lastly, the solid obtained is heated at 600° C. for 2 h in a stream of air in order to obtain the catalyst. This catalyst presents a characteristic X-ray diffractogram like the one shown in FIG. 4b.

Example 10. Preparation of a Catalyst by Co-Precipitation Method, Based on Tin and Niobium Oxides with a Molar Ratio Sn/Ti=0.33 [Sn—Ti—O (0.33)]

4.91 g of tin (IV) chloride pentahydrate and 5.68 ml of an aqueous solution of titanium oxychloride with hydrochloric acid are added in 200.0 ml of water, which are kept under stirring until the complete dissolution thereof. Next, a 28% NH$_4$OH solution is added dropwise until reaching pH=9. The resulting gel is transferred to a container where it is left to age for 24 h at room temperature. After a washing and filtering step, the solid is dried at 100° C. overnight. Lastly, the solid obtained is heated at 600° C. for 2 h in a stream of air in order to obtain the catalyst. This catalyst presents a characteristic X-ray diffractogram like the one shown in FIG. 4c.

Example 11. Preparation of a Catalyst by Co-Precipitation Method, Based on Tin and Niobium Oxides with a Molar Ratio Sn/Ti=0.18 [Sn—Ti—O (0.18)]

3.51 g of tin (IV) chloride pentahydrate and 8.08 ml of aqueous solution of titanium oxychloride with hydrochloric acid are added in 200.0 ml of water, which are kept under stirring until the complete dissolution thereof. Next, a 28% NH$_4$OH solution is added dropwise until reaching pH=9. The resulting gel is transferred to a container where it is left to age for 24 h at room temperature. After a washing and filtering step, the solid is dried at 100° C. overnight. Lastly, the solid obtained is heated at 600° C. for 2 h in a stream of air in order to obtain the catalyst. This catalyst presents a characteristic X-ray diffractogram like the one shown in FIG. 4d.

Example 12. Preparation of a Catalyst by Co-Precipitation Method, Based on Tin, Niobium and Titanium Oxides with a Molar Ratio Sn/(Ti+Nb)=0.60 [Sn—Nb—Ti—O (0.60)]

Figure 5:
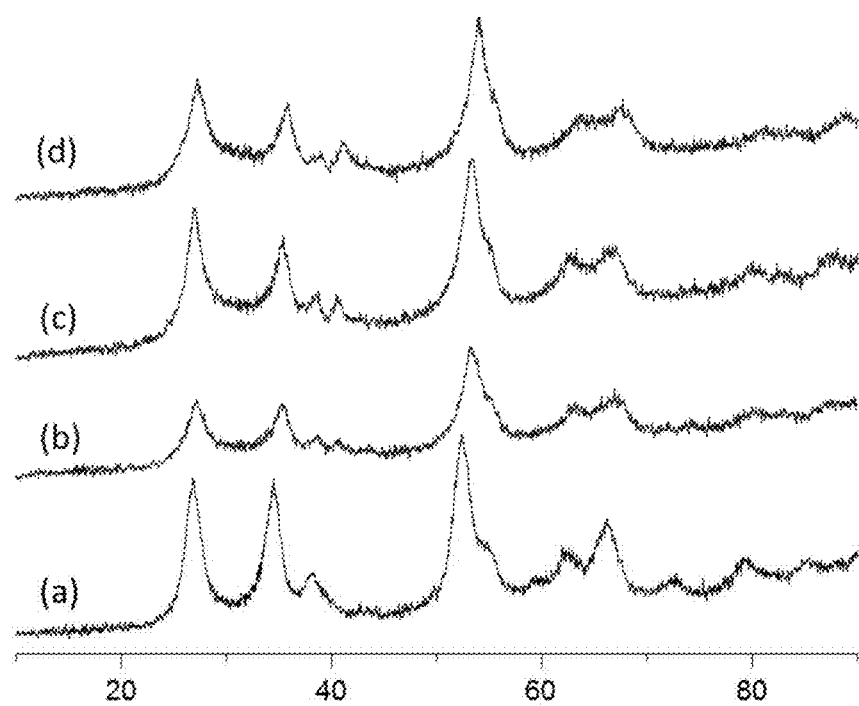
FIG. 5 shows X-ray diffractograms of catalysts based on oxides of tin, titanium and niobium [Sn—Nb—Ti—O] described in examples 12 to 15.

9.35 g of tin (IV) chloride pentahydrate and 1.33 ml of an aqueous solution of titanium oxychloride with hydrochloric acid and 5.05 g of niobium oxalate are added in 200.0 ml of water, which are kept under stirring until the complete dissolution thereof. Next, a 28% NH$_4$OH solution is added dropwise until reaching pH=9. The resulting gel is transferred to a container where it is left to age for 24 h at room temperature. After a washing and filtering step, the solid is dried at 100° C. overnight. Lastly, the solid obtained is heated at 600° C. for 2 h in a stream of air in order to obtain the catalyst. This catalyst presents a characteristic X-ray diffractogram like the one shown in FIG. 5a.

Example 13. Preparation of a Catalyst by Co-Precipitation Method, Based on Tin, Niobium and Titanium Oxides with a Molar Ratio Sn/(Ti+Nb)=0.35 [Sn—Nb—Ti—O (0.35)]

5.84 g of tin (IV) chloride pentahydrate and 3.37 ml of an aqueous solution of titanium oxychloride with hydrochloric acid and 5.05 g of niobium oxalate are added in 200.0 ml of water, which are kept under stirring until the complete dissolution thereof. Next, a 28% NH$_4$OH solution is added dropwise until reaching pH=9. The resulting gel is transferred to a container where it is left to age for 24 h at room temperature. After a washing and filtering step, the solid is dried at 100° C. overnight. Lastly, the solid obtained is heated at 600° C. for 2 h in a stream of air in order to obtain the catalyst. This catalyst presents a characteristic X-ray diffractogram like the one shown in FIG. 5b.

Example 14. Preparation of a Catalyst by Co-Precipitation Method, Based on Tin, Niobium and Titanium Oxides with a Molar Ratio Sn/(Ti+Nb)=0.29 [Sn—Nb—Ti—O (0.29)]

4.67 g of tin (IV) chloride pentahydrate and 2.70 ml of an aqueous solution of titanium oxychloride with hydrochloric acid and 8.08 g of niobium oxalate are added in 200.0 ml of water, which are kept under stirring until the complete dissolution thereof. Next, a 28% NH$_4$OH solution is added dropwise until reaching pH=9. The resulting gel is transferred to a container where it is left to age for 24 h at room temperature. After a washing and filtering step, the solid is dried at 100° C. overnight. Lastly, the solid obtained is heated at 600° C. for 2 h in a stream of air in order to obtain the catalyst. This catalyst presents a characteristic X-ray diffractogram like the one shown in FIG. 5c.

Example 15. Preparation of a Catalyst by Co-Precipitation Method, Based on Tin, Niobium and Titanium Oxides with a Molar Ratio Sn/(Ti+Nb)=0.16 [Sn—Nb—Ti—O (0.16)]

2.34 g of tin (IV) chloride pentahydrate and 5.40 ml of an aqueous solution of titanium oxychloride with hydrochloric acid and 5.05 g of niobium oxalate are added in 200.0 ml of water, which are kept under stirring until the complete dissolution thereof. Next, a 28% $NH_4OH$ solution is added dropwise until reaching pH=9. The resulting gel is transferred to a container where it is left to age for 24 h at room temperature. After a washing and filtering step, the solid is dried at 100° C. overnight. Lastly, the solid obtained is heated at 600° C. for 2 h in a stream of air in order to obtain the catalyst. This catalyst presents a characteristic X-ray diffractogram like the one shown in FIG. 5d.

Example 16. Preparation of a Catalyst Based on Mixed Oxides of Ce and Zr [Ce—Zr—O] by the Co-Precipitation Method This catalyst was synthesised in order to illustrate catalysts of mixed Ce—Zr oxides commonly used in literature for these types of condensation reactions [A. Gangadharan et al., *Appl. Catal. A: Gral.*, 385 (2010) 80]. Several catalysts with different Ce—Zr ratios were synthesised, and the catalyst that provided the best results, in terms of yield of organics and conversion was selected to be compared with the catalysts of the present invention.

Figure 6:
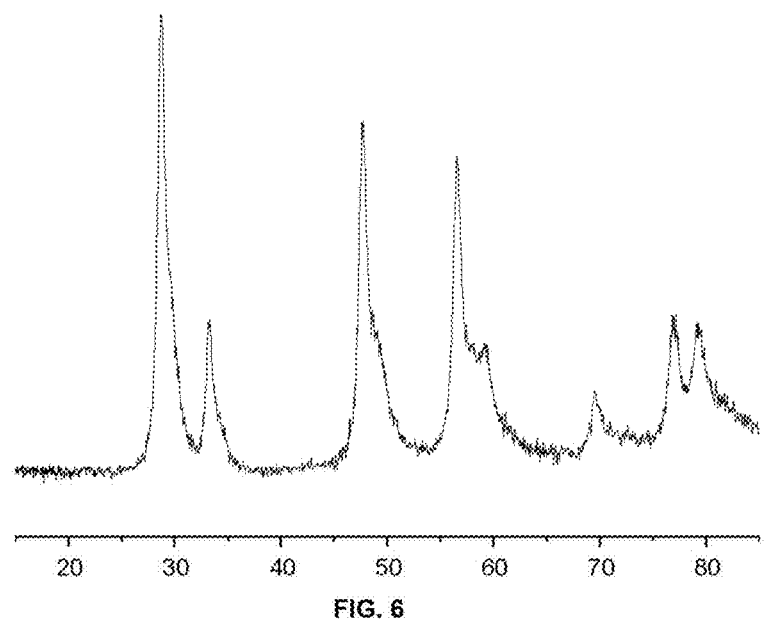
FIG. 6 shows the X-ray diffractogram of a catalyst based on Ce—Zr—O (Example 16).

The catalyst was prepared by the method of synthesis by co-precipitation of the mixed Ce—Zr oxide adapting the method published by Serrano-Ruiz et al. [*J. Catal.*, 241 (2006) 45-55]. In order to synthesise the catalyst $Ce_{0.5}Zr_{0.5}O_2$, an aqueous solution of the salts of both metals in equimolar proportion is prepared. 11.76 g of $Ce(NO_3)_3 \cdot 6H_2O$ and 6.70 g of $ZrO(NO_3)_2 \cdot H_2O$ are added in 150 ml of water, which are kept under stirring until the complete dissolution thereof. Next, a 28% $NH_4OH$ solution is added dropwise until reaching pH=10. Subsequently, the solution is transferred to a flask where it is left to age under stirring and at room temperature for 65 h. After a washing and filtering step, the solid is dried at 100° C. overnight. Lastly, the solid obtained is heated at 450° C. for 2 h in a stream of air in order to obtain the catalyst. The amounts of Ce and Zr measured by ICP coincide with the formula $Ce_{0.5}Zr_{0.5}O_2$, and the X-ray diffractogram obtained for this sample indicates the presence of mixed oxides of Ce and Zr (FIG. 6)

Example 17. Preparation of a Catalyst Based on Mixed Oxides of Tin and Niobium [Nb—$SnO_2$ Impreg.] Using an Impregnation Method A mixed oxide catalyst was synthesised with an Sn—Nb ratio similar to the one used for the catalyst of example 4, in order to be able to be compared in terms of catalytic activity with the catalysts of the present invention.

Figure 7:
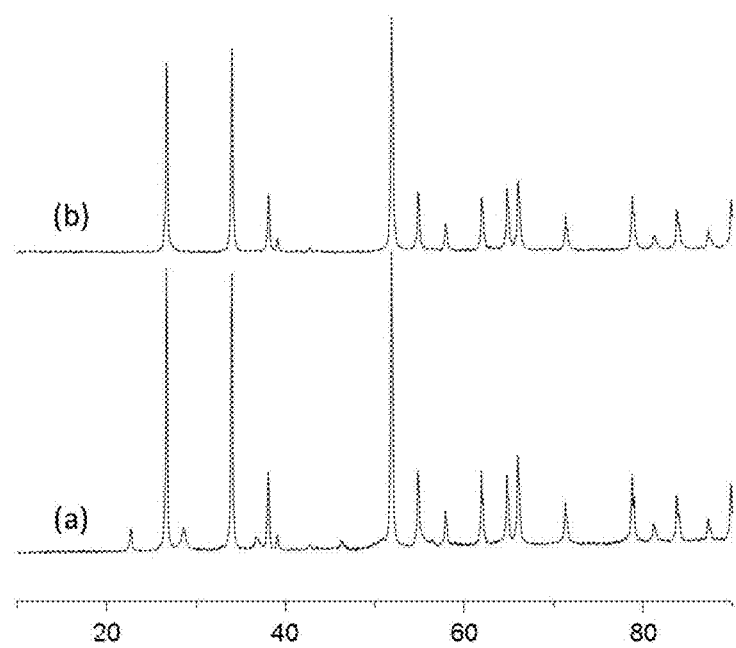
FIG. 7 shows X-ray diffractograms of catalysts based on Nb and Ti supported by impregnation on tin oxide [Nb/SnO$_2$ and Ti/SnO$_2$] described in examples 17 and 18, respectively.

The catalyst was prepared by the pore volume impregnation synthesis method. In order to synthesise the Nb—$SnO_2$ catalyst, an aqueous solution is prepared containing 1.86 g of niobium oxalate in a volume of water previously calculated to impregnate about 1.5 g of commercial $SnO_2$. The solution is added dropwise on said support until a homogeneous gel is obtained. After a drying step at a temperature of 100° C., the solid obtained is heated at 600° C. for 2 h in a stream of air in order to obtain the catalyst. This catalyst presents a characteristic X-ray diffractogram like the one shown in FIG. 7a.

Example 18. Preparation of a Catalyst Based on Mixed Oxides of Sn and Ti [Ti—$SnO_2$ Impreg.] Using an Impregnation Method A mixed oxide catalyst was synthesised with an Sn—Ti ratio similar to the one used for the catalyst of example 8, in order to be able to be compared in terms of catalytic activity with the catalysts of the present invention.

The catalyst was prepared by the pore volume impregnation synthesis method. In order to synthesise the Ti—$SnO_2$ catalyst, an aqueous solution is prepared containing 0.7 ml of an aqueous solution of titanium oxychloride with hydrochloric acid in a volume of water previously calculated to impregnate about 1.5 g of commercial $SnO_2$. The solution is added dropwise on said support until a homogeneous gel is obtained. After a drying step at a temperature of 100° C., the solid obtained is heated at 600° C. for 2 h in a stream of air in order to obtain the catalyst. This catalyst presents a characteristic X-ray diffractogram like the one shown in FIG. 7b.

Example 19. Comparative Catalytic Activity of the Sn—Nb Series Catalysts of Examples 1, 2, 4, 5, 6 and 7

The catalytic activity experiments were carried out in the liquid phase using 12 ml stainless steel autoclave reactors with a reinforced interior coated with PEEK (polyether-ethyl-ketone) and equipped with a magnetic stirrer, pressure gauge and inlet/outlet valve for gases and liquid samples. The reactors are located on an individual steel jacket support with closed-loop temperature control.

The initial feed consists of a model aqueous mixture containing oxygenated compounds simulating the residual aqueous streams that are obtained after a phase separation process, after the pyrolysis of the biomass. The composition of the model aqueous mixture is detailed below (Table 1):

TABLE 1

Composition of the model aqueous mixture used as initial feed in the autoclave reactor.

| Component | Content (% by weight) |
|---|---|
| Water | 30 |
| Propionaldehyde | 25 |
| Hydroxyacetone | 5 |
| Acetic acid | 30 |
| Ethanol | 10 |

3000 mg of the model aqueous mixture and 150 mg of one of the catalytic materials from Examples 1, 2, 4-7 were introduced into the autoclave reactor described above. The reactor was hermetically sealed, was initially pressurised with 13 bar of N2, and was heated to 200° C. under continuous stirring. Liquid samples (≈50-100 µl) were taken at different time intervals up to 7 hours of reaction. The samples were filtered and diluted in a standard solution of 2% by weight of chlorobenzene in methanol, and analysed by gas chromatography in a GC-Bruker 430 equipped with an FID detector and a 60 m TRB-624 capillary column. The product identification is carried out using an Agilent 6890 N Gas Chromatography system coupled with an Agilent 5973 N (GC-MS) Mass Detector and equipped with a 30 m long HP-5 MS capillary column.

Figure 8:
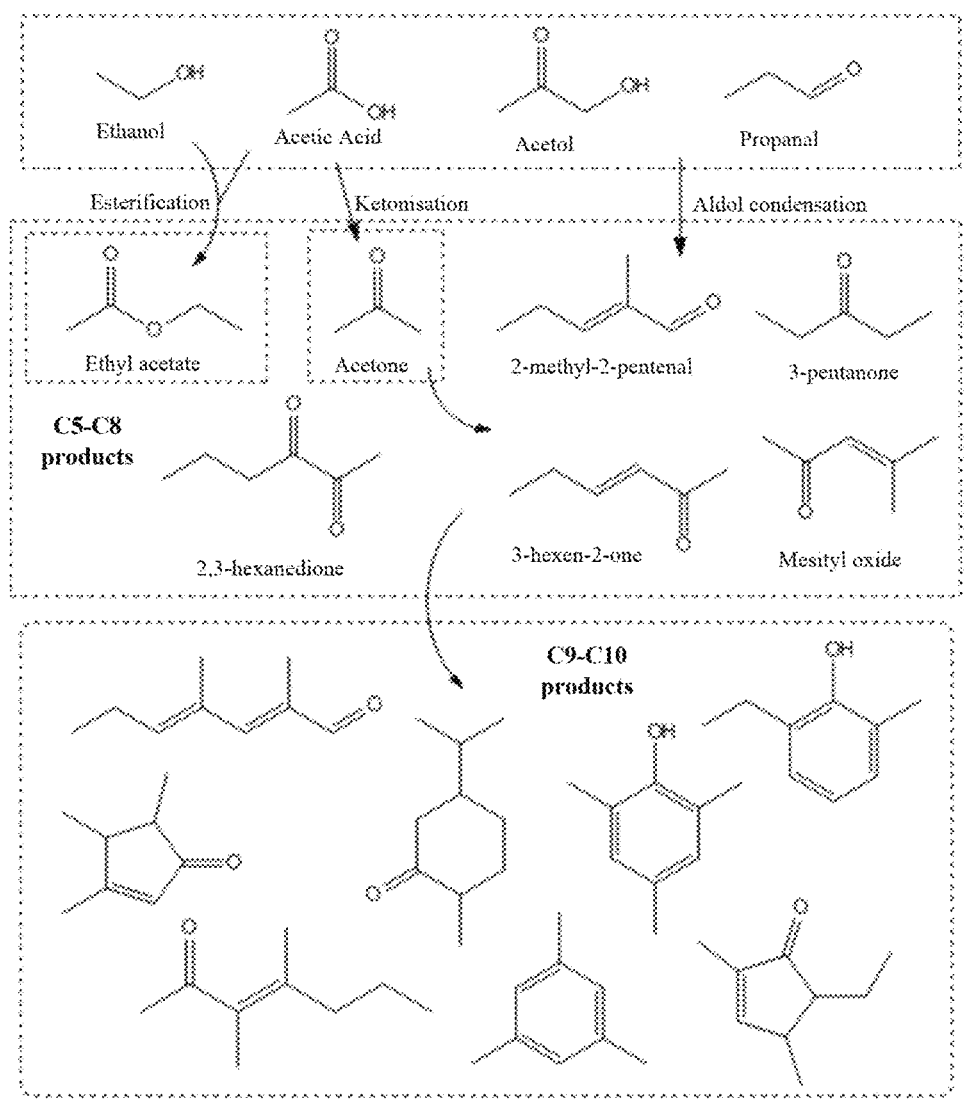
FIG. 8 shows a diagram with the chemical structures of reactants and main reaction products, together with the reactions that take place during the process.

The quantification of the products is carried out from the response factors calculated using the internal standard (solution of 2% by weight of chlorobenzene in methanol) and the organic compounds obtained with more than 5 carbon atoms are classified and quantified in ranges or intervals of compounds, the response factors of which have been calculated from representative molecules thereof. In addition to the main primary condensation reaction products, such as acetone, ethyl acetate, 3-pentanone and 2-methyl-2-pentenal, groups of molecules with 5, 6, 7, 8, 9, 10 or more than 10 carbon atoms are distinguished, produced by consecutive condensation reactions of reactants and primary products. To simplify the quantification of these reaction products, these molecules are grouped into two large groups of compounds, namely: C5-C8 Products and C9-C10+ Products. The chemical structures of the reactants and the main reaction products, together with the most significant reactions that take place during the process, are detailed in FIG. 8.

In the examples of catalytic activity illustrated, the following parameters are used to analyse the results obtained:

The conversion (in molar percentage) for each one of the oxygenated compounds present in the model aqueous mixture was calculated from the following formula:

Conversion (%)=(initial moles of oxygenated comp.−final moles of oxygenated comp./Initial moles of oxygenated comp.)*100

The final yield (in percentage by weight) of each of the products obtained was calculated from the following formula:

Product yield (%)=grams of product$_i$ in the reactor/total grams in the reactor Yield of Total Organics (in percent by weight), was calculated from the following formula:

Total Organics (%)=(Yield$_{Acetone}$+Yield$_{3\text{-}pentanone}$+Yield$_{2\text{-}methyl\text{-}2\text{-}pentenal}$+Yield$_{C5\text{-}C8}$+Yield$_{C9\text{-}C10+}$)

Furthermore, taking into account the composition of the model aqueous mixture used, the maximum of total organic products that could be obtained is calculated, supposing that:

100% conversion of all the reagents is reached.

Acetic acid can be converted into ethyl acetate (esterification product) and acetone (ketonisation product).

The final products are C9 type compounds (there are no intermediate or longer chain products in the final mixture).

With these assumptions, the composition of the final mixture would be:

51.3% water, 19.1% ethyl acetate and 29.6% C9 products.

Therefore, the catalytic results (expressed as yield of total products) are calculated considering ≈30% as the maximum possible.

In this manner, the following results were obtained for the catalytic activity experiments with the catalysts based on Sn and Nb of Ex. 1, 2, 4, 5, 6 and 7:

TABLE 2

Catalytic activity in the conversion of oxygenated compounds present in a model aqueous mixture of catalysts based on Sn and/or Nb of Examples 1, 2, 4, 5, 6 and 7.

| | | Example | | | | | |
|---|---|---|---|---|---|---|---|
| | | 1 | 4 | 5 | 6 | 7 | 2 |
| | | Catalyst | | | | | |
| | | $SnO_2$ | Sn—Nb—O (0.77) | Sn—Nb—O (0.58) | Sn—Nb—O (0.43) | Sn—Nb—O (0.29) | $Nb_2O_5$ |
| Conversion (%) | Acetic acid | 12.2 | 14.9 | 4.9 | 6.7 | 13.2 | 11.5 |
| | Propionaldehyde | 81.2 | 90.9 | 96.1 | 92.7 | 85.9 | 67.2 |
| | Ethanol | 45.7 | 54.2 | 55.6 | 54.5 | 50.3 | 34.4 |
| | Hydroxyacetone | 100.0 | 100.0 | 100.0 | 100.0 | 100.0 | 100.0 |
| Final Yield (%) | Acetone | 1.0 | 1.2 | 1.0 | 1.6 | 2.2 | 0.7 |
| | Ethyl acetate | 23.1 | 20.4 | 17.3 | 17.3 | 24.6 | 24.2 |
| | 3-pentanone | 0.9 | 1.0 | 0.8 | 0.7 | 1.3 | 1.3 |
| | 2-methyl-2-pentenal | 32.9 | 33.2 | 32.6 | 31.9 | 33.5 | 29.0 |
| | C5-C8 | 14.5 | 13.4 | 12.7 | 11.4 | 10.9 | 11.2 |
| | C9-C10+ | 8.5 | 17.1 | 18.6 | 18.2 | 16.6 | 9.5 |
| | Total Organics | 57.8 | 65.9 | 65.7 | 63.8 | 64.5 | 51.7 |

From the comparison of the results in Table 2, it is observed that the conversion of hydroxyacetone is in all cases 100%, while the propionaldehyde conversion reaches a maximum (≈96%) for catalysts with an Sn/Nb molar ratio close to 0.6. Acetone (condensation product of the acetic acid) is present in the final mixture in amounts less than 1.5%, due to the fact that most of the acetic acid reacts with ethanol via esterification to give ethyl acetate. Furthermore, acetone is a highly reactive compound that can give rise to condensation products with a higher molecular weight.

Furthermore, it is observed how for molar ratios Sn/Nb≈0.4-0.6, the intermediate condensation products (C5-C8) gradually decrease in order to give rise to products with a higher molecular weight in subsequent condensation steps. Likewise, the increase in the conversion of the propionaldehyde causes the amount of 2-methyl-2-pentenal (the product of the first self-condensation of the propionaldehyde) to increase and successively convert into condensation products in the interval C9-C10+. Therefore, the Yield of Total Organics is maximised at those catalyst compositions.

These results show that the combination of Sn and Nb oxides in the structure of these catalysts produces higher yields of condensation products and, in general, higher yield of products in the range C9-C10+ than the identical $SnO_2$ catalyst thereof without niobium (example 1). Moreover, the catalyst without tin $Nb_2O_5$ (example 2) shows even worse catalytic activity (both in conversion of oxygenated compounds and in yield of total organics, <52%). In contrast, even when there are small amounts of Sn present in the catalyst (See result with low concentrations of Sn, catalyst from Ex. 7), a mixed oxide with a rutile structure is formed which implies an improvement in the catalytic results. All this would indicate that there is an optimal range in the Sn/Nb ratio (between Examples 4, 5 and 6) in the structure of the catalyst in order to achieve maximum yields in the conversion of oxygenated compounds present in aqueous mixtures derived from the biomass.

Example 20. Comparative Catalytic Activity of the Sn—Ti Series Catalysts of Examples 1, 3, 8, 9, 10 and 11

3000 mg of the model aqueous mixture and 150 mg of one of the catalytic materials from Examples 1, 3, 8-11 were introduced into the autoclave reactor described above. The reactor was hermetically sealed, was initially pressurised with 13 bar of N2, and was heated to 200° C. under continuous stirring. Liquid samples (≈50-100 μl) were taken at different time intervals up to 7 hours of reaction. The samples were filtered and diluted in a standard solution of 2% by weight of chlorobenzene in methanol, and analysed by gas chromatography in a GC-Bruker 430 equipped with an FID detector and a 60 m TRB-624 capillary column. The product identification is carried out using an Agilent 6890 N Gas Chromatography system coupled with an Agilent 5973 N (GC-MS) Mass Detector and equipped with a 30 m long HP-5 MS capillary column.

In this manner, the following results were obtained for the catalytic activity experiments with the catalysts based on Sn and Ti of Ex. 1, 3, 8, 9, 10 and 11:

condensation of the propionaldehyde) and above all, the products from second step condensation in the interval C9-C10+, to grow.

Therefore, the Yield of Total Organics has the same behaviour. This means that the yield of Total Organics, and particularly the production of C9-C10 compounds, can be increased by synthesising the materials in suitable Sn—Ti—O compositions.

These results show that the combination of Sn and Ti oxides in the structure of these catalysts produce higher yields of condensation products and, in general, higher yield of products in the range C9-C10+ than the identical $SnO_2$ catalyst thereof without titanium (Example 1). Furthermore, the catalyst without tin, $TiO_2$ (Example 3) shows an acceptable catalytic activity (yield of total organics, ≈57%), although the result is not entirely comparable, since when synthesising this oxide by co-precipitation, the resulting phase is $TiO_2$-anatase. All this would indicate that the synthesis of mixed oxides based on Sn/Ti with a rutile structure (Examples 8 to 11) in the catalyst structure represents an improvement in the conversion of oxygenated compounds present in aqueous mixtures derived from the biomass.

Example 21. Comparative Catalytic Activity of the Sn—Ti—Nb Series Catalysts of Examples 1, 2, 12, 13, 14 and 15

3000 mg of the model aqueous mixture and 150 mg of one of the catalytic materials from Examples 1, 2, 12-15 were

TABLE 3

Catalytic activity in the conversion of oxygenated compounds present in a model aqueous mixture of catalysts based on Sn and/or Ti of Examples 1, 3, 8, 9, 10 and 11.

| | | Example | | | | | |
|---|---|---|---|---|---|---|---|
| | | 1 | 8 | 9 | 10 | 11 | 3 |
| | | Catalyst | | | | | |
| | | $SnO_2$ | Sn—Ti—O (0.74) | Sn—Ti—O (0.64) | Sn—Ti—O (0.33) | Sn—Ti—O (0.18) | $TiO_2$ |
| Conversion (%) | Acetic acid | 12.2 | 11.9 | 6.7 | 10.2 | 10.8 | 5.6 |
| | Propionaldehyde | 81.2 | 86.2 | 87.9 | 87.6 | 88.5 | 76.0 |
| | Ethanol | 45.7 | 51.9 | 51.0 | 51.4 | 51.4 | 46.5 |
| | Hydroxyacetone | 100.0 | 100.0 | 100.0 | 100.0 | 100.0 | 100.0 |
| Final Yield (%) | Acetone | 1.0 | 0.1 | 0.2 | 1.2 | 1.4 | 0.2 |
| | Ethyl acetate | 23.1 | 23.4 | 22.4 | 22.4 | 21.7 | 24.4 |
| | 3-pentanone | 0.9 | 1.1 | 1.1 | 1.1 | 1.1 | 0.7 |
| | 2-methyl-2-pentenal | 32.9 | 32.1 | 32.7 | 30.7 | 29.4 | 30.8 |
| | C5-C8 | 14.5 | 11.7 | 12.4 | 13.9 | 13.5 | 11.8 |
| | C9-C10+ | 8.5 | 14.4 | 14.0 | 16.5 | 15.5 | 13.2 |
| | Total Organics | 57.8 | 59.5 | 60.4 | 63.5 | 60.9 | 56.7 |

From the comparison of the results in Table 3, it is observed that the conversion of hydroxyacetone is in all cases 100%, while the propionaldehyde conversion reaches a maximum (≈88%) for all the catalysts based on mixed oxide wherein there is a rutile Sn—Ti phase, regardless of the Sn/Ti molar ratio. Acetone (condensation product of the acetic acid) is present in the final mixture in amounts less than 1.0%, due to the fact that most of the acetic acid reacts to give ethyl acetate. Furthermore, acetone is a highly reactive compound that can give rise to condensation products with a higher molecular weight.

It is seen that by having a mixed Sn—Ti phase, the conversion of propionaldehyde increases and causes the amount of 2-methyl-2-pentenal (product of the first selfintroduced into the autoclave reactor described above. The reactor was hermetically sealed, was initially pressurised with 13 bar of N2, and was heated to 200° C. under continuous stirring. Liquid samples (≈50-100 μl) were taken at different time intervals up to 7 hours of reaction. The samples were filtered and diluted in a standard solution of 2% by weight of chlorobenzene in methanol, and analysed by gas chromatography in a GC-Bruker 430 equipped with an FID detector and a 60 m TRB-624 capillary column. The product identification is carried out using an Agilent 6890 N Gas Chromatography system coupled with an Agilent 5973 N (GC-MS) Mass Detector and equipped with a 30 m long HP-5 MS capillary column.

In this manner, the following results were obtained for the catalytic activity experiments with the catalysts based on Sn—Ti—Nb of Ex. 1, 2, 12, 13, 14 and 15:

TABLE 4

Catalytic activity in the conversion of oxygenated compounds present in a model aqueous mixture of catalysts based on Sn and/or Ti and/or Nb of Examples 1, 2, 12, 13, 14 and 15.

|   |   | Example | | | | | |
|---|---|---|---|---|---|---|---|
|   |   | 1 | 12 | 13 | 14 | 15 | 2 |
|   |   | Catalyst | | | | | |
|   |   | $SnO_2$ | Sn—Ti—Nb—O (0.60) | Sn—Ti—Nb—O (0.35) | Sn—Ti—Nb—O (0.29) | Sn—Ti—Nb—O (0.16) | $Nb_2O_5$ |
| Conversion (%) | Acetic acid | 12.2 | 16.0 | 14.4 | 8.0 | 12.1 | 11.5 |
|   | Propionaldehyde | 81.2 | 93.2 | 93.8 | 93.0 | 94.2 | 67.2 |
|   | Ethanol | 45.7 | 48.7 | 49.8 | 44.2 | 41.6 | 34.4 |
|   | Hydroxyacetone | 100.0 | 100.0 | 100.0 | 100 | 100.0 | 100.0 |
| Final Yield (%) | Acetone | 1.0 | 1.3 | 1.0 | 1.5 | 0.8 | 0.7 |
|   | Ethyl acetate | 23.1 | 22.6 | 21.4 | 24.3 | 24.8 | 24.2 |
|   | 3-pentanone | 0.9 | 1.0 | 0.9 | 0.7 | 0.7 | 1.3 |
|   | 2-methyl-2-pentenal | 32.9 | 32.6 | 29.5 | 32.1 | 31.3 | 29.0 |
|   | C5-C8 | 14.5 | 13.3 | 16.8 | 13.7 | 13.1 | 11.2 |
|   | C9-C10+ | 8.5 | 17.4 | 17.6 | 16.3 | 18.4 | 9.5 |
|   | Total Organics | 57.8 | 65.6 | 65.7 | 64.3 | 64.3 | 51.7 |

From the comparison of the results in Table 4, it is observed that the conversion of hydroxyacetone is in all cases 100%, while the propionaldehyde conversion increases dramatically when a mixed oxide of Sn with Ti and Nb is formed in the catalysts used.

Acetone (condensation product of the acetic acid) is present in the final mixture in amounts less than 1.5%, due to the fact that most of the acetic acid reacts by esterification to produce ethyl acetate. Furthermore, acetone is a highly reactive compound that can give rise to condensation products with a higher molecular weight.

The increase in the conversion of the propionaldehyde causes the amount of 2-methyl-2-pentenal (product of the first self-condensation of the propionaldehyde) to increase and therefore, be able to continue reacting in order to give rise to condensation products in the interval C9-C10+(the result of subsequent condensation steps). Both the C9-C10+ products and the Yield of Total Organics have the same behaviour.

These results show that the combination of oxides of Sn, Ti and Nb in the structure of these catalysts produce higher yields of condensation products and, in general, higher yield of products in the range C9-C10+ than the simple oxide catalyst thereof: $SnO_2$ (Example 1), $Nb_2O_5$ (Example 2) or $TiO_2$ (Example 3). All this would confirm that the formation of a mixed oxide phase with rutile phase with a Sn/(Ti+Nb) ratio (between Examples 12 and 15) in the catalyst structure enables the maximum yields to be achieved in the conversion of oxygenated compounds present in aqueous mixtures derived from the biomass.

Example 22. Comparative Catalytic Activity of the Sn—Nb Series Catalysts (Examples 4 and 5) Compared to Nb—$SnO_2$ Oxide Prepared by Impregnation (Example 17) and Commercial $Nb_2O_5$ (Sigma-Aldrich, CAS 1313-96-8)

3000 mg of the model aqueous mixture and 150 mg of one of the catalytic materials from Examples 4, 5, 17 and of commercial $Nb_2O_5$ were introduced into the autoclave reactor described above. The reactor was hermetically sealed, was initially pressurised with 13 bar of N2, and was heated to 200° C. under continuous stirring. Liquid samples (≈50-100 μl) were taken at different time intervals up to 7 hours of reaction. The samples were filtered and diluted in a standard solution of 2% by weight of chlorobenzene in methanol, and analysed by gas chromatography in a GC-Bruker 430 equipped with an FID detector and a 60 m TRB-624 capillary column. The product identification is carried out using an Agilent 6890 N Gas Chromatography system coupled with an Agilent 5973 N (GC-MS) Mass Detector and equipped with a 30 m long HP-5 MS capillary column.

The following results were obtained:

TABLE 5

Catalytic activity in the conversion of oxygenated compounds present in a model aqueous mixture of catalysts based on Sn and Nb, Examples 4 and 5, compared to the results of the Nb—$SnO_2$ catalyst prepared by impregnation (Example 17) or of the commercial $Nb_2O_5$.

|   |   | Example | | | |
|---|---|---|---|---|---|
|   |   | 4 | 5 | 17 |   |
|   |   | Catalyst | | | |
|   |   | Sn—Nb—O (0.77) | Sn—Nb—O (0.58) | Nb—$SnO_2$ | Commercial $Nb_2O_5$ |
| Conversion (%) | Acetic acid | 14.9 | 4.9 | 16.7 | 15.4 |
|   | Propionaldehyde | 90.9 | 96.1 | 67.6 | 70.6 |
|   | Ethanol | 54.2 | 55.6 | 45.9 | 50.7 |
|   | Hydroxyacetone | 100.0 | 100.0 | 100.0 | 100.0 |

TABLE 5-continued

Catalytic activity in the conversion of oxygenated compounds
present in a model aqueous mixture of catalysts based on Sn and Nb,
Examples 4 and 5, compared to the results of the Nb—SnO₂ catalyst
prepared by impregnation (Example 17) or of the commercial Nb₂O₅.

|  |  | Example |  |  |
|---|---|---|---|---|
|  |  | 4 | 5 | 17 |
|  |  | Catalyst |  |  |
|  |  | Sn—Nb—O (0.77) | Sn—Nb—O (0.58) | Nb—SnO₂ | Commercial Nb₂O₅ |
| Final Yield (%) | Acetone | 1.2 | 1.0 | 1.5 | 0.2 |
|  | Ethyl acetate | 20.4 | 17.3 | 27.2 | 22.3 |
|  | 3-pentanone | 1.0 | 0.8 | 0.9 | 0.6 |
|  | 2-methyl-2-pentenal | 33.2 | 32.6 | 29.2 | 26.7 |
|  | C5-C8 | 13.4 | 12.7 | 12.8 | 5.3 |
|  | C9-C10+ | 17.1 | 18.6 | 11.9 | 16.3 |
|  | Total Organics | 65.9 | 65.7 | 56.3 | 49.0 |

In Table 5, the catalytic results of catalysts based on structures containing Sn—Nb—O prepared by co-precipitation and described above (Examples 4 and 5) are compared with another catalyst based on mixed oxides of both metals and prepared by the impregnation method, the preparation of which is described in Example 17. Furthermore, a commercial Nb₂O₅ catalyst is also used acquired from Sigma-Aldrich, which is similarly activated prior to use.

From the results of Table 5, the total conversion of hydroxyacetone is observed in all cases, while the conversion of acetic acid is quite similar in all the cases studied (close to 15%).

The propionaldehyde conversion is the biggest difference between one type of catalyst and the others. While catalysts based on combined Sn—Nb structures have conversions >90%, the commercial niobium catalyst and the Nb—SnO₂ catalyst (Example 17), have much lower conversions (67-70%). This causes the decrease in the formation of first condensation products such as 2-methyl-2-pentenal and some C5-C8 products, as well as products with a higher molecular weight created by means of second condensation reactions. In these cases, the Yield of Total Organics decreases to 49-56%, which means that the use of catalysts based on specific Sn—Nb structures such as that of Examples 4 and 5 increases by 15-25% the products obtained in the final reaction mixture of the condensation of oxygenated compounds present in aqueous mixtures derived from biomass. These products are potentially usable as additives in fractions of gasoline and of refining in general.

These results show that the catalysts of the method of the present invention show results in activity and yields to products superior to those obtained with catalysts prepared by means of conventional methods or with similar commercial materials.

Example 23. Comparative Catalytic Activity of the Catalysts of the Sn—Ti Series (Examples 10 and 11) Compared to Ti—SnO₂ Oxide Prepared by Impregnation (Example 18) and Samples of Commercial Anatase TiO₂ (Sigma-Aldrich, CAS 1317-70-0) and Commercial Rutile TiO₂ (Sigma-Aldrich, CAS 1317-80-2)

3000 mg of the model aqueous mixture and 150 mg of one of the catalytic materials from Examples 10, 11, 18 and samples of commercial TiO₂ were introduced into the autoclave reactor described above. The reactor was hermetically sealed, was initially pressurised with 13 bar of N2, and was heated to 200° C. under continuous stirring. Liquid samples (≈50-100 μl) were taken at different time intervals up to 7 hours of reaction. The samples were filtered and diluted in a standard solution of 2% by weight of chlorobenzene in methanol, and analysed by gas chromatography in a GC-Bruker 430 equipped with an FID detector and a 60 m TRB-624 capillary column. The product identification is carried out using an Agilent 6890 N Gas Chromatography system coupled with an Agilent 5973 N (GC-MS) Mass Detector and equipped with a 30 m long HP-5 MS capillary column.

The following results were obtained:

TABLE 6

Catalytic activity in the conversion of oxygenated compounds present in a model aqueous mixture
of catalysts based on Sn and Ti, Examples 10 and 11, compared to the results of the Ti—SnO₂ catalyst
prepared by impregnation (Example 18) or from samples of commercial TiO₂.

|  |  | Example |  |  |  |  |
|---|---|---|---|---|---|---|
|  |  | 10 | 11 | 18 |  |  |
|  |  | Catalyst |  |  |  |  |
|  |  | Sn—Ti—O (0.33) | Sn—Ti—O (0.18) | Ti—SnO₂ | Commercial TiO₂ (Anatase) | Commercial TiO₂ (Rutile) |
| Conversion (%) | Acetic acid | 10.2 | 10.8 | 18.7 | 16.4 | 9.8 |
|  | Propionaldehyde | 87.6 | 88.5 | 67.9 | 66.4 | 58.4 |
|  | Ethanol | 51.4 | 51.4 | 47.7 | 46.0 | 39.0 |
|  | Hydroxyacetone | 100.0 | 100.0 | 100.0 | 100.0 | 100.0 |

TABLE 6-continued

Catalytic activity in the conversion of oxygenated compounds present in a model aqueous mixture of catalysts based on Sn and Ti, Examples 10 and 11, compared to the results of the Ti—SnO$_2$ catalyst prepared by impregnation (Example 18) or from samples of commercial TiO$_2$.

|  |  | Example | | | | |
|---|---|---|---|---|---|---|
|  |  | 10 | 11 | 18 | | |
|  |  | | | Catalyst | | |
|  |  | Sn—Ti—O (0.33) | Sn—Ti—O (0.18) | Ti—SnO$_2$ | Commercial TiO$_2$ (Anatase) | Commercial TiO$_2$ (Rutile) |
| Final Yield (%) | Acetone | 1.2 | 1.4 | 2.0 | 1.0 | 0.4 |
|  | Ethyl acetate | 22.4 | 21.7 | 20.7 | 28.1 | 23.4 |
|  | 3-pentanone | 1.1 | 1.1 | 1.0 | 0.7 | 0.6 |
|  | 2-methyl-2-pentenal | 30.7 | 29.4 | 18.4 | 28.9 | 25.0 |
|  | C5-C8 | 13.9 | 13.5 | 19.8 | 6.7 | 14.0 |
|  | C9-C10+ | 16.5 | 15.5 | 10.0 | 13.7 | 8.2 |
|  | Total Organics | 63.5 | 60.9 | 51.4 | 51.0 | 48.2 |

In Table 6, the catalytic results of catalysts based on structures containing Sn—Ti—O prepared by co-precipitation and described above (Examples 10 and 11) are compared with another catalyst based on mixed oxides of both metals and prepared by the impregnation method, the preparation of which is described in Example 18. Furthermore, samples of commercial TiO$_2$ acquired from Sigma-Aldrich are also used, which is similarly activated prior to use.

From the results of Table 6, the total conversion of hydroxyacetone is observed in all cases, while the conversion of acetic acid is quite similar in all the cases studied (close to 10-15%).

The propionaldehyde conversion is the biggest difference between one type of catalyst and the others. While catalysts based on combined Sn—Ti structures have conversions >87%, the samples of commercial titanium oxide and the Ti—SnO$_2$ catalyst (Example 18), have much lower conversions (58-68%). This causes the decrease in the formation of first condensation products such as 2-methyl-2-pentenal and some C5-C8 products, as well as products with a higher molecular weight created by means of second condensation reactions. In these cases, the Yield of Total Organics decreases to 48-51%, which means that the use of catalysts based on specific Sn—Ti structures such as that of Examples 10 and 11 increases by ≈20% the products obtained in the final reaction mixture of the condensation of oxygenated compounds present in aqueous mixtures derived from biomass. These products are potentially usable as additives in fractions of gasoline and of refining in general.

These results show that the catalysts of the method of the present invention show results in activity and yields to products superior to those obtained with catalysts prepared by means of conventional methods or with similar commercial materials.

Example 24. Comparative Catalytic Activity of the Catalysts of the Sn—Nb—O, Sn—Ti—O and Sn—Ti—Nb—O Series Prepared by Co-Precipitation Method (Examples 4, 5, 10, 11, 12 and 13)

3000 mg of the model aqueous mixture and 150 mg of one of the catalytic materials from Examples 4, 5, 10, 11, 12 and 13 were introduced into the autoclave reactor described above. The reactor was hermetically sealed, was initially pressurised with 13 bar of N2, and was heated to 200° C. under continuous stirring. Liquid samples (≈50-100 µl) were taken at different time intervals up to 7 hours of reaction. The samples were filtered and diluted in a standard solution of 2% by weight of chlorobenzene in methanol, and analysed by gas chromatography in a GC-Bruker 430 equipped with an FID detector and a 60 m TRB-624 capillary column. The product identification is carried out using an Agilent 6890 N Gas Chromatography system coupled with an Agilent 5973 N (GC-MS) Mass Detector and equipped with a 30 m long HP-5 MS capillary column.

The following results were obtained:

TABLE 7

Catalytic activity in the conversion of oxygenated compounds present in a model aqueous mixture of catalysts based on Sn and/or Nb and/or Ti, prepared by co-precipitation, Examples 4, 5, 10, 11, 12 and 13.

|  |  | Example | | | | | |
|---|---|---|---|---|---|---|---|
|  |  | 4 | 5 | 10 | 11 | 12 | 13 |
|  |  | | | | Catalyst | | |
|  |  | Sn—Nb—O (0.77) | Sn—Nb—O (0.58) | Sn—Ti—O (0.33) | Sn—Ti—O (0.18) | Sn—Ti—Nb—O (0.60) | Sn—Ti—Nb—O (0.35) |
| Conversion (%) | Acetic acid | 14.9 | 4.9 | 10.2 | 10.8 | 16.0 | 14.4 |
|  | Propionaldehyde | 90.9 | 96.1 | 87.6 | 88.5 | 93.2 | 93.8 |
|  | Ethanol | 54.2 | 55.6 | 51.4 | 51.4 | 48.7 | 49.8 |
|  | Hydroxyacetone | 100.0 | 100.0 | 100.0 | 100.0 | 100.0 | 100.0 |

TABLE 7-continued

Catalytic activity in the conversion of oxygenated compounds present in a model aqueous mixture of catalysts based on Sn and/or Nb and/or Ti, prepared by co-precipitation, Examples 4, 5, 10, 11, 12 and 13.

| | | Example 4 | Example 5 | Example 10 | Example 11 | Example 12 | Example 13 |
|---|---|---|---|---|---|---|---|
| | | Catalyst | | | | | |
| | | Sn—Nb—O (0.77) | Sn—Nb—O (0.58) | Sn—Ti—O (0.33) | Sn—Ti—O (0.18) | Sn—Ti—Nb—O (0.60) | Sn—Ti—Nb—O (0.35) |
| Final Yield (%) | Acetone | 1.2 | 1.0 | 1.2 | 1.4 | 1.3 | 1.0 |
| | Ethyl acetate | 20.4 | 17.3 | 22.4 | 21.7 | 22.6 | 21.4 |
| | 3-pentanone | 1.0 | 0.8 | 1.1 | 1.1 | 1.0 | 0.9 |
| | 2-methyl-2-pentenal | 33.2 | 32.6 | 30.7 | 29.4 | 32.6 | 29.5 |
| | C5-C8 | 13.4 | 12.7 | 13.9 | 13.5 | 13.3 | 16.8 |
| | C9-C10+ | 17.1 | 18.6 | 16.5 | 15.5 | 17.4 | 17.6 |
| | Total Organics | 65.9 | 65.7 | 63.5 | 60.9 | 65.6 | 65.7 |

In Table 7, the catalytic results of catalysts based on structures containing Sn—Nb—O, Sn—Ti—O and Sn—Nb—Ti—O prepared by co-precipitation and then heat treated in an atmosphere made of air at 600° C. as described above (Examples 4, 5, 10, 11, 12 and 13) are compared.

From the results of Table 7, the total conversion of hydroxyacetone is observed in all cases is 100%, while the acetic acid conversion is quite similar in the catalysts shown here (Examples 4, 10, 11, 12, 13); being somewhat less in the material of example 5.

The yield of 2-methyl-2-pentenal, C9-C10 products and in general yield of Total Organic products can be increased by synthesising the materials in suitable compositions, thus achieving catalysts based on specific structures of Sn—Nb—O, Sn—Ti—O and Sn—Ti—Nb—O such as in Examples 4, 5, 10, 11, 12 and 13.

Example 25. Comparative Catalytic Activity of the Catalysts of the Sn—Nb—O, Sn—Ti—O and Sn—Ti—Nb—O Series, Prepared by Co-Precipitation (Examples 5, 10 and 13) Compared to a Conventional Ce—Zr Catalyst (Example 16)

3000 mg of the model aqueous mixture and 150 mg of one of the catalytic materials from Examples 5, 10, 13 and 16 were introduced into the autoclave reactor described above. The reactor was hermetically sealed, was initially pressurised with 13 bar of N2, and was heated to 200° C. under continuous stirring. Liquid samples (≈50-100 µl) were taken at different time intervals up to 7 hours of reaction. The samples were filtered and diluted in a standard solution of 2% by weight of chlorobenzene in methanol, and analysed by gas chromatography in a GC-Bruker 430 equipped with an FID detector and a 60 m TRB-624 capillary column. The product identification is carried out using an Agilent 6890 N Gas Chromatography system coupled with an Agilent 5973 N (GC-MS) Mass Detector and equipped with a 30 m long HP-5 MS capillary column.

The following results were obtained:

TABLE 8

Comparative catalytic activity of catalysts based on Sn, Nb and/or Ti of Examples 5, 10 and 13 in the conversion of oxygenated compounds present in a model aqueous mixture compared to a conventional Ce—Zr catalyst (Example 16).

| | | Example 5 | Example 10 | Example 13 | Example 16 |
|---|---|---|---|---|---|
| | | Catalyst | | | |
| | | Sn—Nb—O (0.58) | Sn—Ti—O (0.33) | Sn—Ti—Nb—O (0.35) | Ce—Zr—O (0.55) |
| Conversion (%) | Acetic acid | 4.9 | 10.2 | 14.4 | 17.4 |
| | Propionaldehyde | 96.1 | 87.6 | 93.8 | 93.8 |
| | Ethanol | 55.6 | 51.4 | 49.8 | 47.8 |
| | Hydroxyacetone | 100.0 | 100.0 | 100.0 | 100.0 |
| Final Yield (%) | Acetone | 1.0 | 1.2 | 1.0 | 0.7 |
| | Ethyl acetate | 17.3 | 22.4 | 21.4 | 19.4 |
| | 3-pentanone | 0.8 | 1.1 | 0.9 | 0.5 |
| | 2-methyl-2-pentenal | 32.6 | 30.7 | 29.5 | 36.8 |
| | C5-C8 | 12.7 | 13.9 | 16.8 | 5.4 |
| | C9-C10+ | 18.6 | 16.5 | 17.6 | 25.2 |
| | Total Organics | 65.7 | 63.5 | 65.7 | 68.5 |

The conversions of propionaldehyde and hydroxyacetone are very similar in the catalysts of Examples 5, 10, 13 and 16, while the Ce—Zr—O catalyst has a higher conversion of acetic acid (results in Table 7). However, both the overall conversion of reagents and the Yield of Total Organics observed are very similar in the three examples studied (64-68%). The only observable difference between catalysts based on oxides of Sn, Nb and/or Ti (Ex. 5, 10 and 13) and the mixed oxide of Ce—Zr (Ex. 16) lies in that the first three have higher production of organic compounds in the interval C5-C8, while the mixed oxide prepared in Example 16 is able to more easily catalyse second condensation reactions, increasing the amount of compounds in the interval C9-C10+.

In general, catalysts based on structures combining Sn, Nb and/or Ti have results similar to those demonstrated by a catalyst such as $Ce_{0.5}Zr_{0.5}O_2$ traditionally used in the literature for reactions of this type.

Once the catalysts of Examples 5, 10, 13 and 16 are used, they are recovered after the reaction, washed with methanol and dried at 100° C. overnight. Subsequently, they are characterised by means of Elemental Analysis (EA) and Thermogravimetry (TG).

The EA study shows that the Ce—Zr catalyst of Example 16 has 3.5% by weight of charcoal (organic products deposited on the catalyst) after washing. The catalyst based on Sn—Nb of Example 5 has only 0.5% by weight of charcoal, demonstrating that there is less deposition of carbonaceous substances during the reactive process, and hence it is less sensitive to deactivation caused by coke deposition.

This characterisation data is confirmed by means of TG analyses. The Ce—Zr catalyst of Example 16 has a loss of mass of 11.5% at a temperature close to 300° C. corresponding to the desorption of the absorbed organic products. In contrast, the catalyst of Example 5 only has a loss of mass of 1.5% at said temperature. This catalyst also shows a loss of mass of 1.8% at a temperature close to 100° C. corresponding to the absorbed water. This amount of absorbed water is also observed in the TG analysis of the catalyst before being used, for which reason the presence of water in the reaction medium is not detrimental to the activity of the catalyst or the stability thereof.

Example 26. Comparative Catalytic Activity During the Reuse of the Sn—Nb—O (Ex. 5), Sn—Ti—O (Ex. 10), and Ce—Zr—O (Ex. 16) Catalysts A series of consecutive reactions were carried out with the catalysts prepared in Examples 5, 10 and 16 in order to compare the activity thereof after several uses. To this end, the initial reaction (R0) and three subsequent reuses (R1, R2 and R3) were performed, all under the same reaction conditions. The catalysts used are recovered after each reaction, washed with methanol and dried at 100° C. overnight. Subsequently, they are characterised by means of Elemental Analysis (EA) and Thermogravimetry (TG).

In each case (R0, R1, R2 and R3), 3000 mg of the model aqueous mixture and 150 mg of one of the catalytic materials from Examples 5, 10, and 16 (fresh or already used) were introduced into the autoclave reactor described above. The reactor was hermetically sealed, was initially pressurised with 13 bar of N2, and was heated to 200° C. under continuous stirring. Liquid samples (≈50-100 μl) were taken at different time intervals up to 7 hours of reaction. The samples were filtered and diluted in a standard solution of 2% by weight of chlorobenzene in methanol, and analysed by gas chromatography in a GC-Bruker 430 equipped with an FID detector and a 60 m TRB-624 capillary column. The product identification is carried out using an Agilent 6890 N Gas Chromatography system coupled with an Agilent 5973 N (GC-MS) Mass Detector and equipped with a 30 m long HP-5 MS capillary column.

Figure 9:
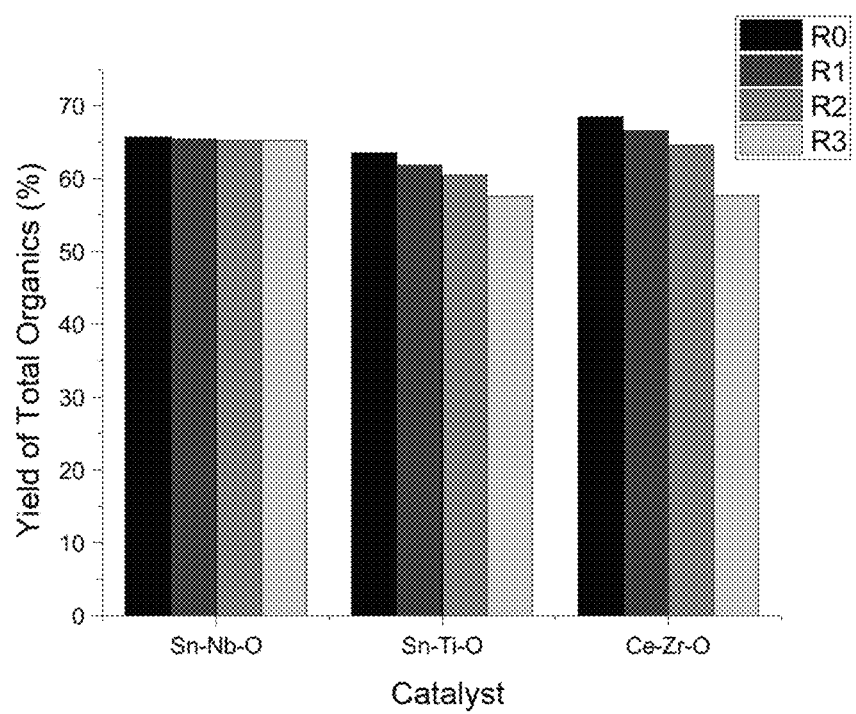
FIG. 9 shows a comparison of the stability and maintenance of the catalytic activity with the reuses of the catalysts Sn—Nb—O (Example 5), Sn—Ti—O (Example 10) and Ce—Zr—O (Example 16).

The obtained results are shown in Tables 9, 10 and 11, and in FIG. 9.

TABLE 9

Catalytic activity during the reuse of the Sn—Nb—O catalyst (0.58) of Example 5.

| | | R0 | R1 | R2 | R3 |
|---|---|---|---|---|---|
| Conversion (%) | Acetic acid | 4.9 | 6.3 | 8.7 | 13.7 |
| | Propionaldehyde | 96.1 | 94.4 | 90.2 | 86.2 |
| | Ethanol | 55.6 | 52.3 | 50.4 | 44.1 |
| | Hydroxyacetone | 100.0 | 100.0 | 100.0 | 100.0 |
| Final Yield (%) | Acetone | 1.0 | 2.0 | 1.8 | 1.7 |
| | Ethyl Acetate | 17.3 | 17.1 | 20.2 | 24.1 |
| | 3-pentanone | 0.8 | 0.8 | 0.9 | 0.9 |
| | 2-methyl-2-pentenal | 32.6 | 32.7 | 33.3 | 34.4 |
| | C5-C8 | 12.7 | 12.4 | 12.5 | 12.5 |
| | C9-C10+ | 18.6 | 17.5 | 16.7 | 15.8 |
| | Total Organics | 65.7 | 65.4 | 65.2 | 65.2 |

TABLE 10

Catalytic activity during the reuse of the Sn—Ti—O catalyst (0.33) of Example 10.

| | | R0 | R1 | R2 | R3 |
|---|---|---|---|---|---|
| Conversion (%) | Acetic acid | 10.2 | 8.9 | 7.9 | 8.6 |
| | Propionaldehyde | 87.6 | 85.3 | 81.5 | 78.2 |
| | Ethanol | 51.4 | 51.8 | 53.5 | 46.2 |
| | Hydroxyacetone | 100.0 | 100.0 | 100.0 | 100.0 |
| Final Yield (%) | Acetone | 1.2 | 1.3 | 1.7 | 1.5 |
| | Ethyl Acetate | 22.4 | 22.0 | 21.6 | 21.8 |
| | 3-pentanone | 1.1 | 0.8 | 0.3 | 1.4 |
| | 2-methyl-2-pentenal | 30.7 | 29.5 | 28.2 | 26.4 |
| | C5-C8 | 13.9 | 14.2 | 14.6 | 12.4 |
| | C9-C10+ | 16.5 | 16.1 | 15.7 | 15.8 |
| | Total Organics | 63.5 | 61.9 | 60.5 | 57.5 |

TABLE 11

Catalytic activity during the reuse of the Ce—Zr—O catalyst of Example 16.

| | | R0 | R1 | R2 | R3 |
|---|---|---|---|---|---|
| Conversion (%) | Acetic acid | 17.4 | 13.4 | 3.8 | 0.0 |
| | Propionaldehyde | 93.8 | 87.8 | 84.8 | 81.2 |
| | Ethanol | 47.8 | 49.7 | 50.1 | 55.3 |
| | Hydroxyacetone | 100.0 | 100.0 | 100.0 | 100.0 |
| Final Yield (%) | Acetone | 0.7 | 0.7 | 0.3 | 0.4 |
| | Ethyl Acetate | 19.4 | 20.2 | 20.0 | 20.9 |
| | 3-pentanone | 0.5 | 0.5 | 0.4 | 0.5 |
| | 2-methyl-2-pentenal | 36.8 | 34.1 | 31.7 | 27.9 |
| | C5-C8 | 5.4 | 6.3 | 7.0 | 7.1 |
| | C9-C10+ | 25.2 | 25.0 | 25.2 | 21.7 |
| | Total Organics | 68.5 | 66.6 | 64.6 | 57.6 |

In general, the same behaviour is observed for all the catalysts in the conversion of the reagents present in the initial aqueous mixture. The propionaldehyde conversion decreases with the number of reactions performed. In contrast, the acetic acid conversion decreases for the case of Ce—Zr—O, while it remains constant or even increases for materials based on Sn—Nb and Sn—Ti. Moreover, the ethanol conversion increases in the case of the catalyst based on Ce—Zr—O (Ex. 16) and decreases slightly in the rest of the catalysts containing Sn and/or Nb and/or Ti (Ex. 5 and 10). Consequently, the Yield of Total Organics slightly decreases with the number of reuses in said catalysts, but the drop is more pronounced in the case of the Ce—Zr—O catalyst of Example 16 with a percentage loss of catalytic activity with respect to the initial one of 16%, while the Sn—Nb—O catalyst prepared in Example 5 has excellent stability with a percentage drop in catalytic activity of only 1% (see FIG. 8). This means that the activity of the Sn—Nb—O catalyst prepared in Example 5 remains practically constant after at least 3 consecutive reuses. Moreover, the catalyst based on Sn—Ti—O of Example 10 shows an intermediate drop in catalytic activity (10%) between the Ce—Zr—O material (Ex. 16) and the Sn—Nb—O catalyst (Ex. 5).

It should be noted that in the case of the Ce—Zr—O catalyst of Example 16, at the end of the reuses only 80 mg of the 150 mg initially added are recovered, while 130 mg are recovered in the case of the Sn—Nb—O catalyst of Example 5. The lower amount of solid catalyst recovered may be due to a lower stability of the Ce—Zr—O catalyst and the possible formation of cerium acetate, which causes the extraction of the cerium oxide from the catalyst structure. This also explains the drastic drop in acetic acid conversion with reuses (Table 11).

At the same time, the analyses performed by means of EA and TG confirm the higher stability of the catalyst based on Sn—Nb of Example 5 and the one based on Sn—Ti of Example 10 compared to the mixed oxide of Ce—Zr prepared in Example 16. Thus, in the Sn—Nb material (Ex. 5) only 0.5% by weight of charcoal is determined by EA after the third reuse (R3); 2.8% in the case of Sn—Ti (Ex. 10), while the amount of charcoal detected in the Ce—Zr catalyst (Ex. 16) after the same number of reuses reached 4.8% by weight. Likewise, it is observed by TG analysis that the Sn—Nb catalyst (Ex. 5) suffers a loss of mass of 1.5% at temperatures close to 300-350° C. corresponding to the absorbed organic products, while the mixed oxide of Ce—Zr (Ex. 16) has a loss of mass of 9.5% at these temperatures, plus an additional 3.3% at temperatures close to 450° C., the latter corresponding to heavier reaction products absorbed in the catalyst.

The invention claimed is:

1. A method for producing mixtures of aliphatic hydrocarbons and aromatic compounds, the method comprising the following steps:
   (a) bringing an aqueous mixture containing oxygenated organic compounds derived from primary treatments of biomass in contact with a catalyst, comprising at least one mixed metal oxide of Sn and Nb, Sn and Ti, and combinations of Sn, Ti and Nb, and which, in the calcined form thereof, is made up of at least 65% by weight of the rutile crystalline phase of $SnO_2$;
   (b) reacting the mixture with the catalyst in a catalytic reactor at temperatures between 50° and 450° C. and under pressures from 1 to 120 bar in the absence of hydrogen; and
   (c) recovering the products obtained in step (b) by means of a liquid/liquid separation of an aqueous and organic phases.

2. The method according to claim 1, wherein the catalyst comprises the empirical formula:

$$Sn_aNb_bTi_cM_dO_e$$

wherein:
   M is a chemical element selected from the group consisting of transition metals, rare earth elements and lanthanides,
   a is comprised between 0.05 and 10.0,
   b and c are comprised between 0 and 10.0, wherein c+b is a value other than zero,
   d is comprised between 0 and 4.0, and
   e has a value which depends on the oxidation state of the elements Sn, Nb, Ti and the element M.

3. The method according to claim 2, wherein d is zero and the catalyst comprises the empirical formula:

$$Sn_aNb_bTi_cM_dO_e$$

wherein:
   a is comprised between 0.05 and 10.0,
   b and c are comprised between 0.05 and 10.0, and
   e has a value which depends on the oxidation state of the elements Sn, Nb and Ti.

4. The method according to claim 2, wherein c is zero and the catalyst comprises the empirical formula:

$$Sn_aNb_bM_dO_e$$

wherein:
   M is a chemical element selected from the group consisting of transition metals, rare earth elements and lanthanides,
   a and b are comprised between 0.05 and 10,
   d is comprised between 0 and 4.0, and
   e has a value which depends on the oxidation state of the elements Sn, Nb and M.

5. The method according to claim 2, wherein b is zero and the catalyst comprises the empirical formula:

$$Sn_aTi_cM_dO_e$$

wherein:
   M is a chemical element selected from the group consisting of transition metals, rare earth elements or lanthanides,
   a and c are comprised between 0.05 and 10,
   d is comprised between 0 and 4.0, and
   e has a value which depends on the oxidation state of the elements Sn, Ti and M.

6. The method according to claim 1, wherein the element M is a transition metal, lanthanide or rare earth element selected from the group consisting of V, Cr, Fe, Co, Ni, Cu, Zn, Mo, Ta, Ti, Re, La and combinations thereof.

7. The method according to claim 1, wherein the oxygenated organic compounds have between 1 and 12 carbon atoms and between 1 and 9 oxygen atoms.

8. The method according to claim 1, wherein a total concentration of the oxygenated organic compounds present in the aqueous mixture derived from the primary treatments of biomass is in a range between 0.5 and 99.5% by weight.

9. The method according to claim 8, wherein a total concentration of the oxygenated organic compounds present in the aqueous mixture derived from the primary treatments of biomass is in a range between 1.0 and 70.0% by weight.

10. The method according to claim 1, wherein the contact between the aqueous mixture and the catalyst is performed in a reactor selected from the group consisting of a batch reactor, a continuous stirred-tank reactor, a continuous fixed-bed reactor and a continuous fluidized-bed reactor.

11. The method according to claim 10, wherein the reactor is a batch reactor and the reaction is carried out in the liquid phase.

12. The method according to claim 11, wherein the process is carried out at a pressure between 1 to 80 bar.

13. The method according to claim 11, wherein the process is performed at a temperature between 100° and 350° C.

14. The method according to claim 11, wherein the contact between the aqueous mixture containing oxygenated organic compounds derived from the primary treatments of biomass and the catalyst is performed in a time ranging from 2 minutes to 200 hours.

15. The method according to claim 11, wherein the weight ratio between the aqueous mixture containing the oxygenated organic compounds derived from the primary treatments of biomass and the catalyst is between 1 and 200.

16. The method according to claim 10, wherein the reactor is a continuous fixed-bed reactor or a continuous fluidised-bed reactor, wherein the reaction temperature is comprised between 100° C. and 350° C.; the contact time is comprised between 0.001 and 200 s; and the working pressure is between 1 and 200 bar.

17. The method according to claim 1, wherein the contact between the aqueous fraction containing oxygenated organic compounds and the catalyst is performed under an atmosphere made of nitrogen, argon, air, nitrogen-enriched air, argon-enriched air, or combinations thereof.

18. The method according to claim 17, wherein the contact is performed in an atmosphere made of nitrogen.

* * * * *